(12) United States Patent
Suzuki

(10) Patent No.: US 10,839,570 B2
(45) Date of Patent: Nov. 17, 2020

(54) GRAPH DISPLAY METHOD, ELECTRONIC DEVICE, AND RECORDING MEDIUM FOR DISPLAYING MODIFIED EXPRESSION IN DIFFERENT WAYS IN RESPONSE TO DETERMINING WHETHER CONDITION REGARDING MODIFIED EXPRESSION IS SATISFIED

(71) Applicant: CASIO COMPUTER CO., LTD., Tokyo (JP)

(72) Inventor: Miki Suzuki, Fuchu (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 16/015,360

(22) Filed: Jun. 22, 2018

(65) Prior Publication Data
US 2018/0374247 A1 Dec. 27, 2018

(30) Foreign Application Priority Data

| Jun. 26, 2017 | (JP) | 2017-124345 |
| Dec. 20, 2017 | (JP) | 2017-243928 |
| May 28, 2018 | (JP) | 2018-101641 |

(51) Int. Cl.
*G06T 11/20* (2006.01)
*G06F 7/544* (2006.01)
(Continued)

(52) U.S. Cl.
CPC ........... *G06T 11/206* (2013.01); *G06F 7/544* (2013.01); *G06F 15/0225* (2013.01);
(Continued)

(58) Field of Classification Search
None
See application file for complete search history.

(56) References Cited

U.S. PATENT DOCUMENTS 5,281,145 A * 1/1994 Sidrak ............... G09B 23/04
434/211
5,535,317 A * 7/1996 Tanaka ............... G06F 15/0225
345/440
(Continued)

FOREIGN PATENT DOCUMENTS

| EP | 2 998 876 A2 | 3/2016 |
| JP | 2011-180267 A | 9/2011 |
| JP | 2011180267 A * | 9/2011 |

OTHER PUBLICATIONS

Extended Supplementary European Search Report dated Apr. 5, 2019 in European Patent Application No. 18 17 9624.4.

*Primary Examiner* — Steven Z Elbinger
(74) *Attorney, Agent, or Firm* — Scully Scott Murphy & Presser

(57) ABSTRACT

A graph display method, wherein
a first graph corresponding to a first mathematical expression is displayed on a display, and
when an operation to input, as a modified expression of the first mathematical expression, a third mathematical expression having a notation different from that of the first mathematical expression is accepted, and a third graph corresponding to the third mathematical expression is displayed on the display, the third graph is displayed on the display in a way of displaying, the way being different depending on whether a condition that the first mathematical expression is mathematically identical to the third mathematical expression is satisfied or not.

10 Claims, 18 Drawing Sheets

(51) Int. Cl.
*G06F 15/02* (2006.01)
*G06F 17/12* (2006.01)
*G09B 5/02* (2006.01)

(52) U.S. Cl.
CPC .......... *G06F 15/0275* (2013.01); *G06F 17/12* (2013.01); *G09B 5/02* (2013.01)

(56) References Cited

U.S. PATENT DOCUMENTS

| | | | |
|---|---|---|---|
| 7,777,744 B2 * | 8/2010 | Wostrel | G06T 11/00 345/440 |
| 2002/0075265 A1 * | 6/2002 | Miller | G06T 11/206 345/440 |
| 2015/0187106 A1 | 7/2015 | Endo | |
| 2016/0041944 A1 * | 2/2016 | Karoji | G06T 11/206 345/440 |
| 2016/0085717 A1 * | 3/2016 | Ono | G06F 15/0225 708/130 |
| 2016/0086512 A1 * | 3/2016 | Yoshizawa | G06F 15/0225 434/201 |

\* cited by examiner

| Equation numbers | Time and date | Dedicated site URL + Argument | (·Equations ·Coordinate range<br>·TRUE/FALSE) |
|---|---|---|---|
| 0 | — | http.//———— | + ———— |
| 1 | — | ———— | + ———— |
| 2 | — | ———— | + ———— |
| 3 | — | ———— | + ———— |
| ⋮ | ⋮ | ⋮ | |

| Equation numbers | Equations | Coordinate range | TRUE/FALSE |
|---|---|---|---|
| 0 | — | — | — |
| 1 | — | — | — |
| 2 | — | — | — |
| 3 | — | — | — |
| ⋮ | ⋮ | ⋮ | ⋮ |

Terminal ID — 31

FIG. 8

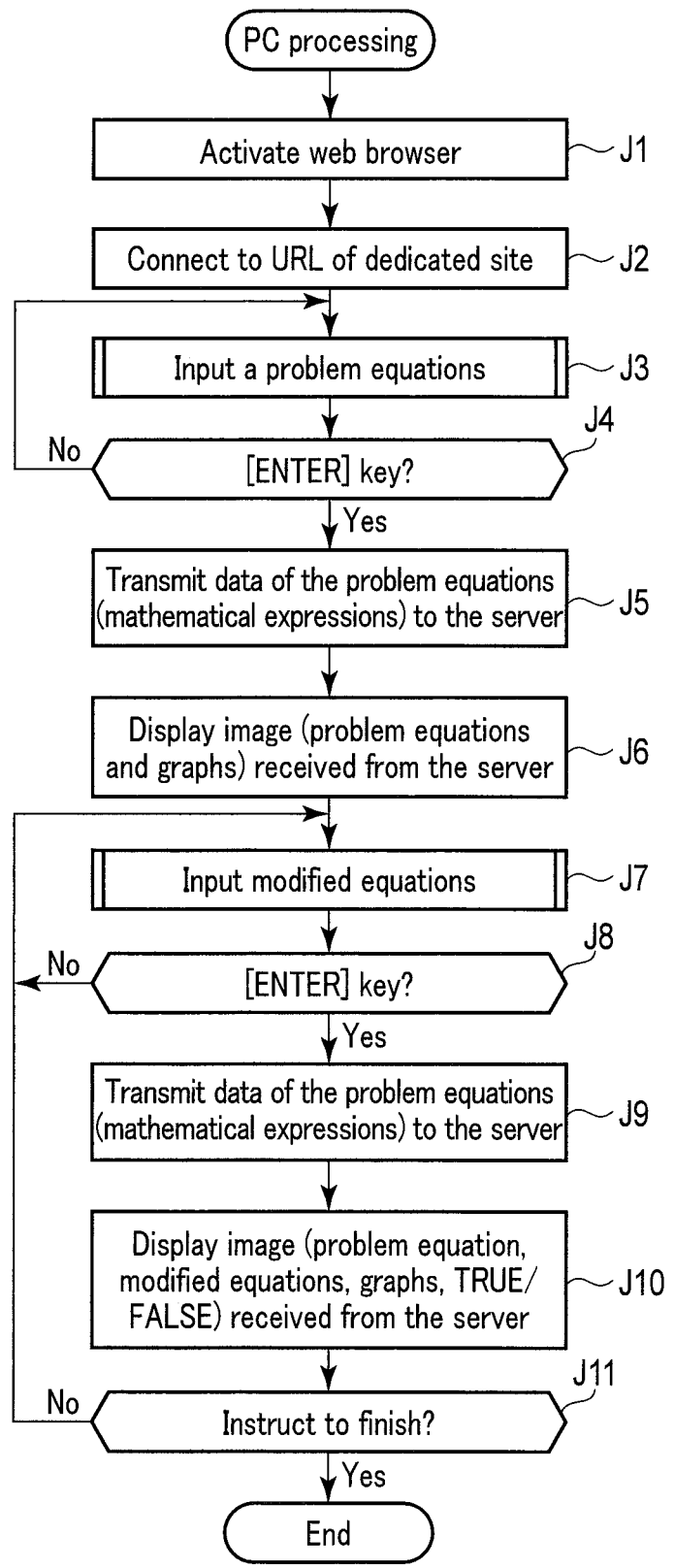
F I G. 17

US 10,839,570 B2

GRAPH DISPLAY METHOD, ELECTRONIC DEVICE, AND RECORDING MEDIUM FOR DISPLAYING MODIFIED EXPRESSION IN DIFFERENT WAYS IN RESPONSE TO DETERMINING WHETHER CONDITION REGARDING MODIFIED EXPRESSION IS SATISFIED

CROSS-REFERENCE TO RELATED APPLICATION

This application is based upon and claims the benefit of priority from Japanese Patent Applications No. 2017-124345, filed Jun. 26, 2017; No. 2017-243928, filed Dec. 20, 2017; and No. 2018-101641, filed May 28, 2018, the entire contents of all of which are incorporated herein by reference.

BACKGROUND OF THE INVENTION

1. Field of the Invention

The technical field relates to a graph display method, an electronic device, and a recording medium.

2. Description of the Related Art

Conventionally, there is known an electronic calculator (graphing scientific calculator) that is capable of calculating solutions to unknowns (variables) included in an equation which is input by a user, and capable of drawing a graph corresponding to the equation and displaying it on a display, as described in Jpn. Pat. Appln. KOKAI Publication No. 2011-180267 (Patent Literature 1).

The graphing scientific calculator described in the Patent Literature 1 notifies a user of whether a modified equation that is input by the user is true or false by displaying a text message, such as "Error!" or "True!", or a character icon corresponding to a text message.

However, this graphing scientific calculator does not have a way to notify a user of whether the input modified equation is true or false other than displaying a text message or a character icon, and therefore, the calculator is not a calculator that shows a relationship between the modified equation and its original equation using graphs.

BRIEF SUMMARY OF THE INVENTION

A graph display method comprises displaying on a display a first graph corresponding to a first mathematical expression and a second graph corresponding to a second mathematical expression, the first mathematical expression and the second mathematical expression being equations that include two or more variables, the first mathematical expression and the second mathematical expression being different from each other; and after accepting an operation to input, as a modified expression for solving the equations, a third mathematical expression having a notation different from that of the first mathematical expression and the second mathematical expression, the third mathematical expression including one of the two variables included in the equations, when a third graph corresponding to the third mathematical expression is displayed on the display, displaying the third graph on the display in a way of displaying, the way being different depending on whether a condition that any one of at least one solution to the one variable obtained from the third mathematical expression matches a solution to the first variable that is selected from at least one set of solutions to the two variables included in the equations obtained from the first mathematical expression and the second mathematical expression is satisfied or not.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute apart of the specification, illustrate embodiments of the invention, and together with the general description given above and the detailed description of the embodiments given below, serve to explain the principles of the invention.

The components in the drawings are not necessarily to scale relative to each other.

FIG. 8 is a drawing showing a terminal data storage area 31 provided in a memory of the graph generation dedicated site (Web server) 30.

FIG. 17 is a flowchart showing a PC process in accordance with a Web browser program 12A in the personal computer PC of the graph display system according to the third embodiment.

DETAILED DESCRIPTION OF THE PREFERRED EMBODIMENTS

Embodiments of the present invention will be described hereinafter with reference to the accompanying drawings.

First Embodiment

Figure 1:
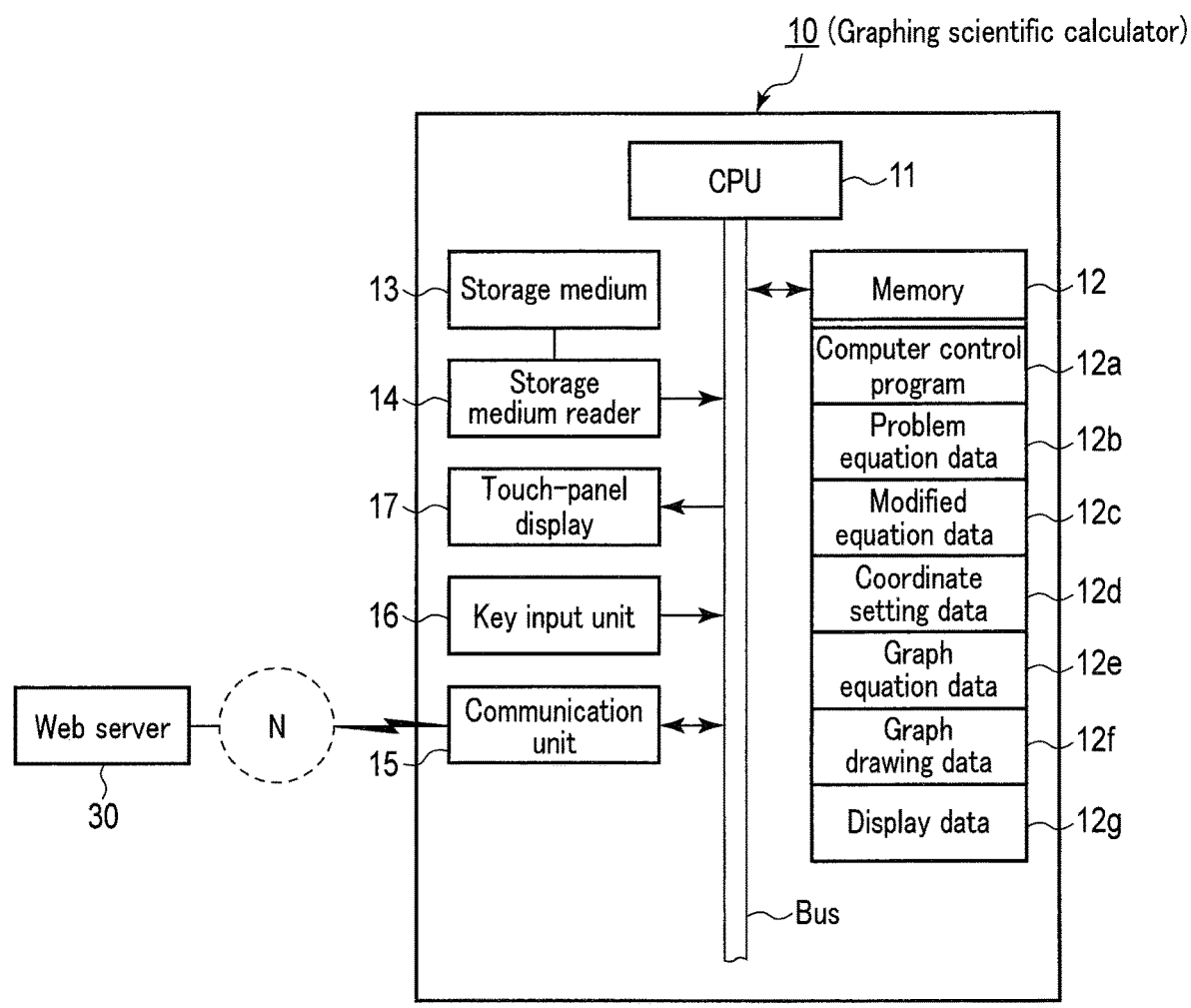
FIG. 1 is a block diagram showing a configuration of an electronic circuit of a graphing scientific calculator 10 according to a first embodiment of an electronic device of the present invention.

FIG. 1 is a block diagram showing a configuration of an electronic circuit of a graphing scientific calculator (first electronic device) 10 according to a first embodiment of an electronic device of the present invention.

The electronic device may be configured as the graphing scientific calculator 10 or as a tablet device, or may be configured as a personal computer, a smartphone, a mobile telephone, a touch-panel personal digital assistant (PDA), an electronic book, or a portable game console, etc., having a calculating function and a graph drawing function (or in which a computer control program is installed).

An electronic device, such as a tablet device which is not equipped with physical keys (buttons) like those provided in the graphing scientific calculator 10, displays a software keyboard similar to the keys of the graphing scientific calculator 10, and performs processing in response to key operations on the software keyboard.

The graphing scientific calculator 10 will be described below.

The electronic circuit of the graphing scientific calculator 10 includes a CPU (controlling unit) 11, which is a computer, and to the CPU 11, a memory 12, a storage medium reader 14, a communication unit 15, a key input unit 16, a touch-panel display 17 are connected via control and data buses.

The CPU 11 controls operations of each part in the circuit in accordance with a computer control program 12a stored in the memory 12, and executes various computing processing in accordance with a key input signal from the key input unit 16. The computer control program 12a may be stored in the memory 12 in advance, or may be read from an external storage medium 13, such as a memory card, via the storage medium reader 14 and stored in the memory 12, or may be downloaded from an external Web server 30 that can be accessed through a communication unit 15 and a communication network (the Internet) N and stored in the memory 12. The computer control program 12a is write-protected from a user's operation on the key input unit 16.

In a rewritable data storage area in the memory 12, a problem equation data area 12b, a modified equation data area 12c, a coordinate setting data area 12d, a graph equation data area 12e, a graph drawing data area 12f, and a display data area 12g are provided.

In the problem equation data area 12b, data of mathematical equations including unknowns, such as linear equations with two unknowns and simultaneous equations with two unknowns, may be stored in advance, or may be input and stored in accordance with a user's operation.

In the process of solving a mathematical equation as a problem equation stored in the problem equation data area 12b, data of modified equations obtained by modifying the equations in accordance with a user's operation is stored in the modified equation data area 12c.

In the coordinate setting data area 12d, data of a coordinate range (coordinate system) (Xmin,max/Ymin,max) for graph drawing, which is set in accordance with the equation as a problem equation and its solution, stored in the problem equation data area 12b, is stored.

In the graph equation data area 12e, data of graph equations for drawing graphs on the coordinate range stored in the coordinate setting data area 12d is stored for each of the equation as a problem equation stored in the problem equation data area 12b and the modified equation stored in the modified equation data area 12c, which is obtained by modifying the problem equation.

In the graph drawing data area 12f, data for drawing a graph which is to be generated by plotting the points on the coordinate range (coordinate system) stored in the coordinate setting data area 12d in accordance with the graph equations stored in the graph equation data area 12e, is stored.

The display data area 12g has a memory area in a size corresponding to the size of the display screen of the LCD display unit constituting the display 17, and in this memory area, display data to be displayed on the display screen is stored as bit map data (herein, bit map data expanded in accordance with the data of the coordinate range and the data of graph drawing).

In the graphing scientific calculator (electronic device) 10 with the above-described configuration, the CPU 11 controls the operations of the respective circuitry components according to the instructions described in the computer control program 12a, and a function of computing, a function of checking a modified equation, and a function of graph drawing, which will be described in the following operational description, are realized by operating software and hardware in conjunction.

Next, the operation of the graphing scientific calculator 10 with the above-described configuration will be described.

Figure 2:
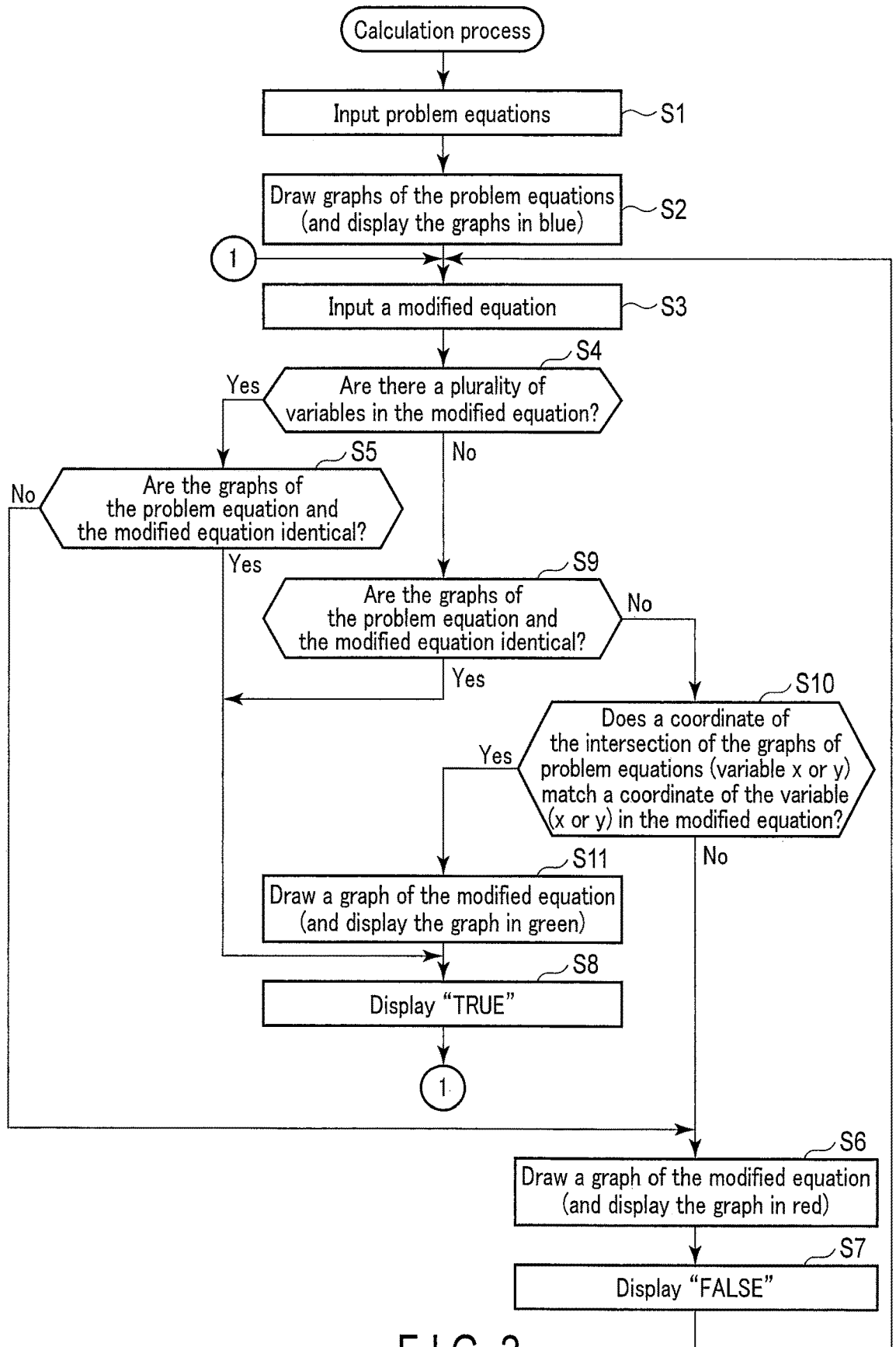
FIG. 2 is a flowchart showing a calculation process in accordance with a computer control program 12a of the graphing scientific calculator 10.

FIG. 2 is a flowchart showing a calculation process in accordance with the computer control program 12a of the graphing scientific calculator 10.

Figure 3:
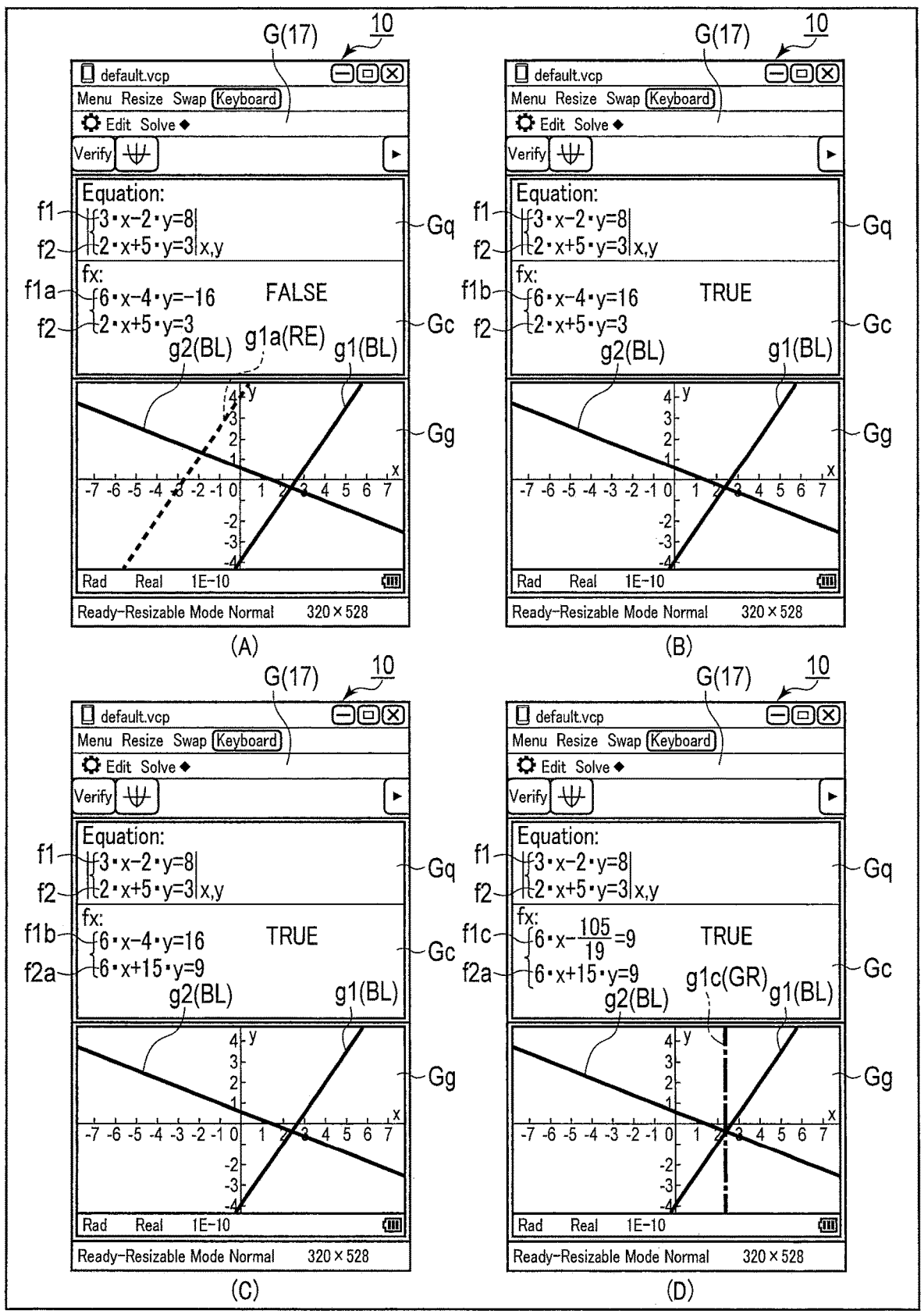
FIG. 3 is a drawing showing a display operation (part 1) corresponding to a user's operation in accordance with a calculation process of the graphing scientific calculator 10.

FIG. 3 shows a display operation (part 1) corresponding to a user's operation in accordance with a calculation process of the graphing scientific calculator 10.

Figure 4:
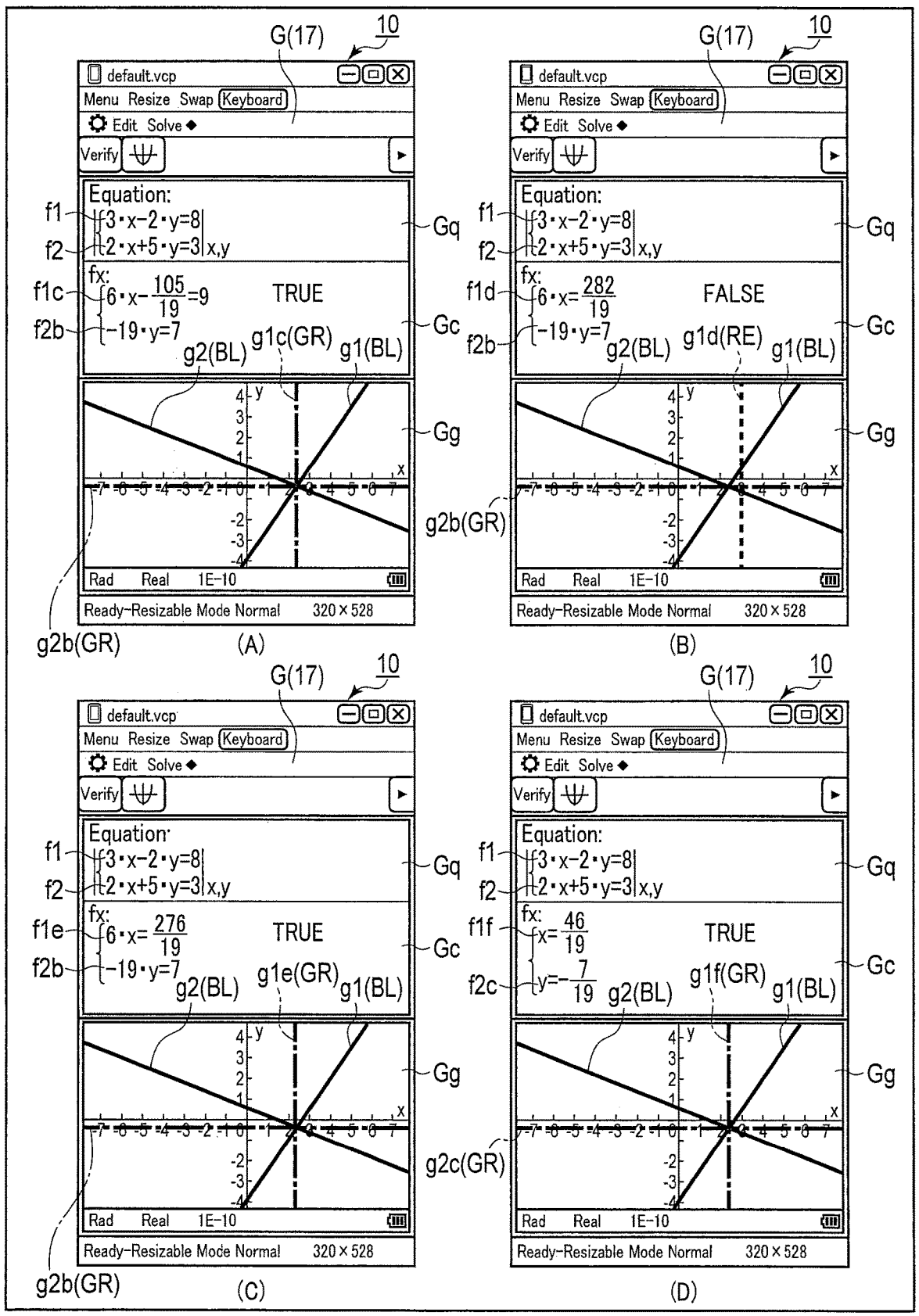
FIG. 4 is a drawing showing a display operation (part 2) corresponding to a user's operation in accordance with a calculation process of the graphing scientific calculator 10.

FIG. 4 shows a display operation (part 2) corresponding to a user's operation in accordance with a calculation process of the graphing scientific calculator 10.

Hereinafter, assume that the graphing scientific calculator 10 is used for learning problem equations through modifying and solving the problem equations in accordance with a user's operation.

First, the graphing scientific calculator 10 is set, in response to a user's operation of the key input unit 16, to an operation mode of calculating a solution to a mathematical equation, and then, as shown in (A) of FIG. 3, a calculation screen G is displayed on the touch-panel display 17, the top part of the calculation screen G being allocated for a problem equation input area Gq, the middle part being allocated for a modified equation input area Gc, and the bottom part being allocated for a graph display area Gg.

A cursor (not shown) indicating a data input position on the calculation screen G is displayed in the problem equation input area Gq in accordance with a user's operation of the cursor keys in the key input unit 16, and mathematical equations (problem equations) which are a target for learning are input (step S1).

These problem equations may be selected by a user from a plurality of problem equations stored in the problem equation data area 12*b* in the memory 12 in advance, or may be newly input by the user.

In this example, the following set of simultaneous equations f1 and f2 with two unknowns is input and displayed as problem equations.

$$3 \cdot x - 2 \cdot y = 8 \qquad \text{f1}$$

$$2 \cdot x + 5 \cdot y = 3 \qquad \text{f2}$$

As shown in (A) of FIG. 3, the vertical bars and the variables x and y shown on the right side of the simultaneous equations f1 and f2 displayed in the problem equation input area Gq mean that a solution set for the variables x and y is sought for the simultaneous equations f1 and f2.

When the input of the simultaneous equations f1 and f2 with two unknowns as problem equations is determined, solutions to the variables x and y in the simultaneous equations f1 and f2 are calculated, a two-degree coordinate range (coordinate system) including the coordinates of the calculated solutions to the variables x and y are set, and the coordinate range is displayed on the graph display area Gg. Then, graph equations for drawing the graphs corresponding to the equations f1 "$3 \cdot x - 2 \cdot y = 8$" and f2 "$2 \cdot x + 5 \cdot y = 3$" within the coordinate range are generated, and as shown in (A) of FIG. 3, the graph g1 corresponding to the equation f1 and the graph g2 corresponding to the equation f2 are drawn and displayed in blue BL in the graph display area Gg (step S2).

As the graphs g1 and g2 corresponding to the simultaneous equations f1 and f2 as the problem equations are displayed, the user can easily visualize the relationship between the variables x and y included in the equations f1 and f2.

To solve the equations f1 and f2 by modifying them, a modified equation f1*a*, which is obtained by modifying the equation f1 is input and displayed in the modified equation input area Gc in accordance with a user's operation as shown in (A) of FIG. 3 (step S3). At this time, in the modified equation input area Gc, the modified equation f1*a*, "$6 \cdot x - 4 \cdot y = -16$", and the equation f2, "$2 \cdot x + 5 \cdot y = 3$", are listed on the display.

In the present embodiment, the equation that is input as a modified equation normally has a different notation from both of the simultaneous equations f1 and f2; however, the notation may be the same as either one of the simultaneous equations f1 and f2. When the notation is different from both of the simultaneous equations f1 and f2, the equation that is input as a modified equation may be or not be mathematically the same as either one of the simultaneous equations f1 and f2. As will be described later, a plurality of modified equations may be input, and in such a case, a set of solutions obtained from two of the modified equations may be or may not be identical to a set of solutions obtained from the simultaneous equations f1 and f2. Normally, the simultaneous equations f1 and f2 have different notations, and they are not mathematically the same either.

When the input of the modified equation f1*a* "$6 \cdot x - 4 \cdot y = -16$" corresponding to the equation f1 "$3 \cdot x - 2 \cdot y = 8$" is determined, it is determined whether there are two or more variables included in the modified equation f1*a* (step S4), and in this example, it is determined that there are two variables, i.e., x and y (Yes in step S4).

Then, it is determined whether the graphs corresponding to the equation f1 "$3 \cdot x - 2 \cdot y = 8$" and the modified equation f1*a* "$6 \cdot x - 4 \cdot y = -16$" match (in other words, are mathematically identical) based on whether the graph equations corresponding to the equation f1 and the modified equation f1*a* are identical or not, and it is determined whether the modification of the modified equation f1*a* is correct or not (step S5).

In this example, the graph equation corresponding to the modified equation f1*a* "$6 \cdot x - 4 \cdot y = -16$" is not identical to the graph equation corresponding to the equation f1 "$3 \cdot x - 2 \cdot y = 8$" stored in the graph equation data area 12*e*, and it is determined that the graphs of the equation f1 and the modified equation f1*a* do not match (No in step S5). Then, as shown in (A) of FIG. 3, a graph g1*a* according to the graph equation corresponding to the modified equation f1*a* is drawn in red RE within the coordinate range shown in the graph display area Gg to distinguish from the graphs g1 and g2 corresponding to the equations f1 and f2 drawn in blue BL in the graph display area Gg (step S6).

Then, in the modified equation input area Gc to which the modified equation f1*a* "$6 \cdot x - 4 \cdot y = -16$" is input, an error message "FALSE" is displayed to notify the user that the modified equation f1*a* is incorrect (step S7).

The user can thereby immediately know that the input modified equation f1*a* "$6 \cdot x - 4 \cdot y = -16$" is incorrect, and easily visualize how the modified equation f1*a* is incorrect based on a difference between the distinguished graph g1*a* shown in red RE corresponding to the modified equation f1*a* "$6 \cdot x - 4 \cdot y = -16$" and the graph g1 corresponding to the equation f1.

Regarding the incorrect modified equation f1*a* "$6 \cdot x - 4 \cdot y = -16$", when a modified equation f1*b* corrected by the user, "$6 \cdot x - 4 \cdot y = 16$", is input and displayed as shown in (B) of FIG. 3 (step S3), it is determined whether the graphs of the equation f1 "$3 \cdot x - 2 \cdot y = 8$" and the modified equation f1*b* "$6 \cdot x - 4 \cdot y = 16$" match or not in a manner similar to the previous determination, and it is determined whether the modification of the modified equation f1*b* is correct or not (step S4, then step S5).

Then, if it is determined that the graph corresponding to the equation f1 "$3 \cdot x - 2 \cdot y = 8$" matches the graph corresponding to the corrected equation f1*b* "$6 \cdot x - 4 \cdot y = 16$" (Yes in step S5), a message "TRUE" is displayed in the modified equation input area Gc to which the corrected modified equation f1*b* has been input to notify the user that the modified equation f1*b* is correct (step S8).

At this time, a graph corresponding to the corrected modified equation f1*b* "$6 \cdot x - 4 \cdot y = 16$" matches the graph g1 corresponding to the equation f1 "$3 \cdot x - 2 \cdot y = 8$" and therefore overlaps the graph g1; thus, the graph corresponding to the modified equation f1*b* is not drawn. The user may be notified that the equation f1 "$3 \cdot x - 2 \cdot y = 8$" and the corrected equation fib "$6 \cdot x - 4 \cdot y = 16$" are mathematically identical by changing the display of the graph g1 with time. More specifically, the graph g1 may be displayed by flashing, or displayed in a different color which can be switched from one to another, or displayed in different thickness or in a different type of line, to make variations in the display with time. Thus, if the equations are mathematically identical, the graph corresponding to the modified equation is displayed overlapping the original equation which is a target for equation modification; accordingly, the former serves as the latter.

Next, as shown in (C) of FIG. 3, when the input of the modified equation f2a "6·x+15·y=9" corresponding to the equation f2 "2·x+5·y=3" is determined in the modified equation input area Gc in response to a user's operation, it is determined that there are two or more variables in the modified equation f2a "6·x+15·y=9" similarly to the previous determination (Yes in step S4), and it is determined whether the graphs corresponding to the equation f2 and the modified equation f2a are identical or not (step S5).

In this example, it is determined that the graph equation corresponding to the modified equation f2a "6·x+15·y=9" is identical to the graph equation corresponding to the equation f2 "2·x+5·y=3" stored in the graph equation data area 12e, and it is determined that the graphs of the equation f2 and the modified equation f2a match (Yes in step S5). Then, a message "TRUE" is displayed in the modified equation input area Gc to which the modified equation f2a has been input to notify that the modified equation f2a is correct, as shown in (C) of FIG. 3 (step S8).

Subsequently, as shown in (D) of FIG. 3, when the modified equation f1c "6·x−(105/19)=9" which is obtained by further modifying the equation f1b "6·x−4·y=16" based on the equation f1 "3·x−2·y=8" is input (step S3), it is determined that there is only one variable included in the modified equation f1c "6·x−(105/19)=9" (x in this example) (No in step S4), and it is determined whether the graph g1 (graph equation) corresponding to the equation f1 is identical to a graph (graph equation) corresponding to the modified equation f1c or not (step S9).

In this example, there are two variables x and y in the graph g1 (graph equation) corresponding to the equation f1 "3·x−2·y=8" (the graph g1 shows a linear line having a gradient with respect to the x and y axes), and there is one variable x in the graph (graph equation) corresponding to the modified equation f1c "6·x−(105/19)=9" (the graph shows a linear line orthogonal to the x axis and parallel to the y axis); therefore, it is determined that the graphs (graph equations) do not match (No in step S9).

Then, it is determined whether or not the coordinate value of the intersection of the graphs g1 and g2 (i.e., a solution to the variable x or y) matches the coordinate value of the variable (x) included in the modified equation f1c "6·x−(105/19)=9" (whether they are mathematically the same or not) (step S10).

In this example, when it is determined that the coordinate value (x) of the intersection of the graphs g1 and g2 matches the coordinate value (x) included in the modified equation f1c "6·x−(105/19)=9" (Yes in step S10), the graph g1c corresponding to the modified equation f1c "6·x−(105/19)=9" which is orthogonal to the axis X and intersecting the intersection of the graphs g1 and g2 corresponding to the equations f1 and f2 is drawn and displayed in green GR, as shown in (D) of FIG. 3 (step S11).

Then, in the modified equation input area Gc to which the modified equation f1c is input, an error message "TRUE" is displayed to notify the user that the modified equation f1c is correct (step S8).

The user can thereby immediately know that the user's input modified equation f1c "6·x−(105/19)=9" is correct, and easily visualize the relationship between the graphs g1 and g2 in blue BL corresponding to the equations f1 and f2 and the graph g1c in green GR corresponding to the modified equation f1c, in other words, visualize the coordinate value of the intersection of the graphs g1, g2, and g1c as a solution of those equations.

Subsequently, as shown in (A) of FIG. 4, when the modified equation f2b "−19·y=7" which is obtained by further modifying the modified equation f2a "6·x+15·y=9" based on the equation f2 "2·x+5·y=3" is input (step S3), it is determined that there is only one variable (y in this example) included in the modified equation f2b "−19·y=7" (No in step S4), and it is determined whether the graph g2 (graph equation) corresponding to the equation f2) is identical to a graph (graph equation) corresponding to the modified equation f2b or not (step S9).

In this example, there are two variables x and y in the graph g2 (graph equation) corresponding to the equation f2 "2·x+5·y=3" (the graph g2 shows a linear line having a gradient with respect to the x and y axes), and there is one variable y in the graph (graph equation) corresponding to the modified equation f2b "−19·y=7" (the graph shows a linear line parallel to the x axis and orthogonal to the y axis); therefore, it is determined that the graphs (graph equations) do not match (No in step S9).

Then, it is determined whether or not the coordinate value of the intersection of the graphs g1 and g2 corresponding to the equations f1 "3·x−2·y=8" and f2 "2·x+5·y=3" (i.e., a solution to the variable x or y) matches the coordinate value of the variable (y) included in the modified equation f2b "−19·y=7" (step S10).

In this example, when it is determined that the coordinate value (y) of the intersection of the graphs g1 and g2 corresponding to the equations f1 and f2 matches the coordinate value (y) included in the modified equation f2b "−19·y=7" (Yes in step S10), the graph g2b corresponding to the modified equation f2b "−19·y=7" which is orthogonal to the axis y and intersecting the intersection of the graphs g1 and g2 corresponding to the equations f1 and f2 is drawn and displayed in green GR, as shown in (A) of FIG. 4 (step S11).

Then, in the modified equation input area Gc to which the modified equation f2b is input, a message "TRUE" is displayed to notify the user that the modified equation f2b is correct (step S8).

Similarly to the above step, the user can thereby immediately know that the user's input modified equation f2b "−19·y=7" is correct, and can easily visualize the relationship among the graphs g1 and g2 in blue BL corresponding to the equations f1 and f2, the graph g1c in green GR corresponding to the modified equation f1c, and the graph g2b in green GR corresponding to the modified equation f2b, in other words, visualize the coordinate value of the intersection of the graphs g1, g2, g1c, and g2b as the solution of those equations.

Next, as shown in (B) of FIG. 4, when the modified equation f1d "6·x=282/19" which is obtained by further modifying the equation f1c "6·x−(105/19)=9" based on the equation f1 "3·x−2·y=8" is input (step S3), it is determined that there is only one variable (x in this example) included in the modified equation f1d "6·x=282/19" (No in step S4), and it is determined whether the graph g1 (graph equation) corresponding to the equation f1) is identical to a graph (graph equation) corresponding to the modified equation f1d or not (step S9).

In this example, there are two variables x and y in the graph g1 corresponding to the equation f1 "3·x−2·y=8" (the graph g1 shows a linear line having a gradient with respect to the x and y axes), and there is one variable x in the graph (graph equation) corresponding to the modified equation f1d "6·x=282/19" (the graph shows a linear line orthogonal to the x axis and parallel to the y axis); therefore, it is determined that the graphs (graph equations) do not match (No in step S9).

Then, it is determined whether or not the coordinate value of the intersection of the graphs g1 and g2 corresponding to the equations f1 "3·x−2·y=8" and f2 "2·x+5·y=3" (i.e., a solution to the variable x or y) matches the coordinate value of the variable (x) included in the modified equation f1d "6·x=282/19" (step S10).

In this example, when it is determined that the coordinate value (x) of the intersection of the graphs g1 and g2 corresponding to the equations f1 and f2 does not match the coordinate value (x) included in the modified equation f1d (No in step S10), the graph g1d based on the graph equation corresponding to the modified equation f1d is distinguishably drawn and displayed in red RE in the coordinate range of the graph display area Gg wherein the graphs g1 and g2 corresponding to the equations f1 and f2 are displayed in blue BL as shown in (B) of FIG. 4 (step S6).

Then, in the modified equation input area Gc to which the modified equation f1d "6·x=282/19" is input, an error message "FALSE" is displayed to notify the user that the modified equation f1d is incorrect (step S7).

The user can thereby immediately know that the input modified equation f1d "6·x=282/19" is incorrect, and easily visualize how the modified equation f1d "6·x−(105/19)=9" is incorrect based on a shift of the distinguished graph g1d shown in red RE corresponding to the modified equation f1d in the positive direction on the x axis with respect to the graphs g1 and g2 in blue BL corresponding to the equations f1 and f2.

Regarding the incorrect modified equation f1d "6·x=282/19", when a modified equation f1e corrected by the user, "6·x=276/19", is input and displayed as shown in (C) of FIG. 4 (step S3), similarly to the previous determination, it is determined whether the coordinate value of the intersection of the graphs g1 and g2 corresponding to the equations f1 "3·x−2·y=8" and f2 "2·x+5·y=3" (i.e., a solution to the variable x or y) matches the coordinate value of the variable (x) included in the modified equation f1e "6·x=276/19", and it is determined whether the modification of the modified equation f1e is correct or not (step S4, step S9, then step S10).

In this example, when it is determined that the coordinate value (x) of the intersection of the graphs g1 and g2 corresponding to the equations f1 and f2 matches the coordinate (x) included in the modified equation f1e "6·x=276/19" (Yes in step S10), the graph g1e corresponding to the modified equation f1e "6·x=276/19" which is orthogonal to the axis x and intersecting the intersection of the graphs g1 and g2 is drawn and displayed in green GR, as shown in (C) of FIG. 4 (step S11).

Then, in the modified equation input area Gc to which the modified equation f1e is input, a message "TRUE" is displayed to notify the user that the modified equation f1e is correct (step S8).

In this case, similarly to the previous step, the user can thereby immediately know that the user's input modified equation f1e "6·x=276/19" is correct, and easily visualize the relationship among the graphs g1 and g2 in blue BL corresponding to the equations f1 and f2, the graph g2b in green GR corresponding to the modified equation f2b, and the graph g1e in green GR corresponding to the modified equation f1e, in other words, the coordinate value of the intersection of the graphs g1, g2, g2b, and g1e as the solution of those equations.

Thereafter, as shown in (D) of FIG. 4, in accordance with a user's operation, a modified equation f1f "x=46/19" which is a final modification of the original equation f1 "3·x−2·y=8", which has been modified in stages (f1a through f1e), and a modified equation f2c "y=−(7/19)", which is a final modification of the original equation f2 "2·x+5·y=3" which has been modified in stages (f2a through f2b) are subsequently input (step S3), similarly to the previous determination, it is determined whether or not the coordinate values (x) (y) of the intersection of the graphs g1 and g2 match the coordinate values of the variables x and y included in the final-stage modified equations f1f and f2c (Yes in step S10). Then, a graph g1f corresponding to the modified equation f1f which is orthogonal to the coordinate axis x and intersecting the intersection of the graphs g1 and g2, and a graph g2c corresponding to the modified equation f2c which is orthogonal to the coordinate axis y, are drawn and displayed in green GR (step S11).

Then, in the modified equation input area Gc to which the modified equations f1f and f2c are input, an error message "TRUE" is displayed to notify the user that the modified equations f1f and f2c are correct (step S8).

Thus, according to the graphing scientific calculator 10 having the above-described configuration, simultaneous equations f1 and f2 with two unknowns as problem equations are displayed in the problem equation input area Gq, and while displaying graphs g1 and g2 corresponding to the equations f1 and f2 in blue BL in a coordinate range of the graph display area Gg, the modified equations f1a to f1f obtained from the equation f1 and modified equations f2a to f2c obtained from the equation f2 are input to the modified equation input area Gc and displayed therein in accordance with a user's operation, so that the user can solve the variables (x and y) included in the equations f1 and f2 through modifying the equations f1 and f2. Then, every time any of the modified equations f1a to f1f and f2a to f2c is input, it is determined whether or not values of the variables obtained from the equations f1 or f2 match values of the variables obtained from the input modified equation f1a to f1f and f2a to f2c (in other words, whether they are mathematically the same or not), and if they do not match, graphs g1a and g1d corresponding to the modified equations f1a and f1d are distinguishably drawn and displayed in red RE in the graph display area Gg, and an error message "FALSE" is displayed in the modified equation input area Gc to notify the user that the modified equations f1a and f1d are incorrect. If they match, a message "TRUE" is displayed to notify the user that the modified equation f1b, f2a, f1c, f2b, f1e, and f1f, or f2c is correct.

The user can thereby immediately know that the user's input modified equations f1a through f1f and f2a through f2c are correct or not, and can easily check how the modified equations f1a and f1d are incorrect based on a difference between the distinguished graphs g1a an g1d shown in red RE corresponding to the modified equations f1a and f1d, and the graphs g1 and g2 drawn in blue BL corresponding to the equations f1 and f2.

According to the graphing scientific calculator 10 having the above-described configuration, when modified equations f1c, f1e, and f2b including one variable (x or y) (an equation with one unknown) which is obtained by modifying the equations f1 and f2 as the problem equations are input, even if the value of the variable (x or y) given by the equations f1 and f2 match the value of the variable (x or y) given by the modified equations f1c, f1e, and f2b (an equation with one unknown), the graphs g1 and g2 corresponding to the equations f1 and f2 are not identical to the graphs g1c, g1e, and g2b corresponding to the modified equations f1c, f1e, and f2b, and therefore, the graphs g1c, g1e, and g2b are drawn and displayed in green GR in the graph display area Gg for discrimination.

It is thereby possible for the user to immediately know that the modified equations f1c, f1e, and f2b are correct, even if the graphs g1c, g1e, and g2b corresponding to the user's input modified equations f1c, f1e, and f2b are not identical to the graphs g1 and g2 corresponding to the equations f1 and f2, and to easily check that the intersection of the graphs g1, g2, g1c, g1e and g2b are the solutions to the equations f1 and f2.

In the first embodiment, the graphing scientific calculator 10 is configured to generate all the graphs, that is, the graphs g1 and g2 corresponding to the equations f1 and f2 as the problem equations, the graphs g1a through g1f corresponding to the modified equations f1a through f1f which are the modifications of the equation f1, and the graphs g2b through g2c corresponding to the modified equations f2a through f2c which are the modifications of the equation f2, in accordance with the calculation process of the graphing scientific calculator 10, and to cause the graph display area Gg of the display 17 to display these graphs.

Second Embodiment

Figure 5:
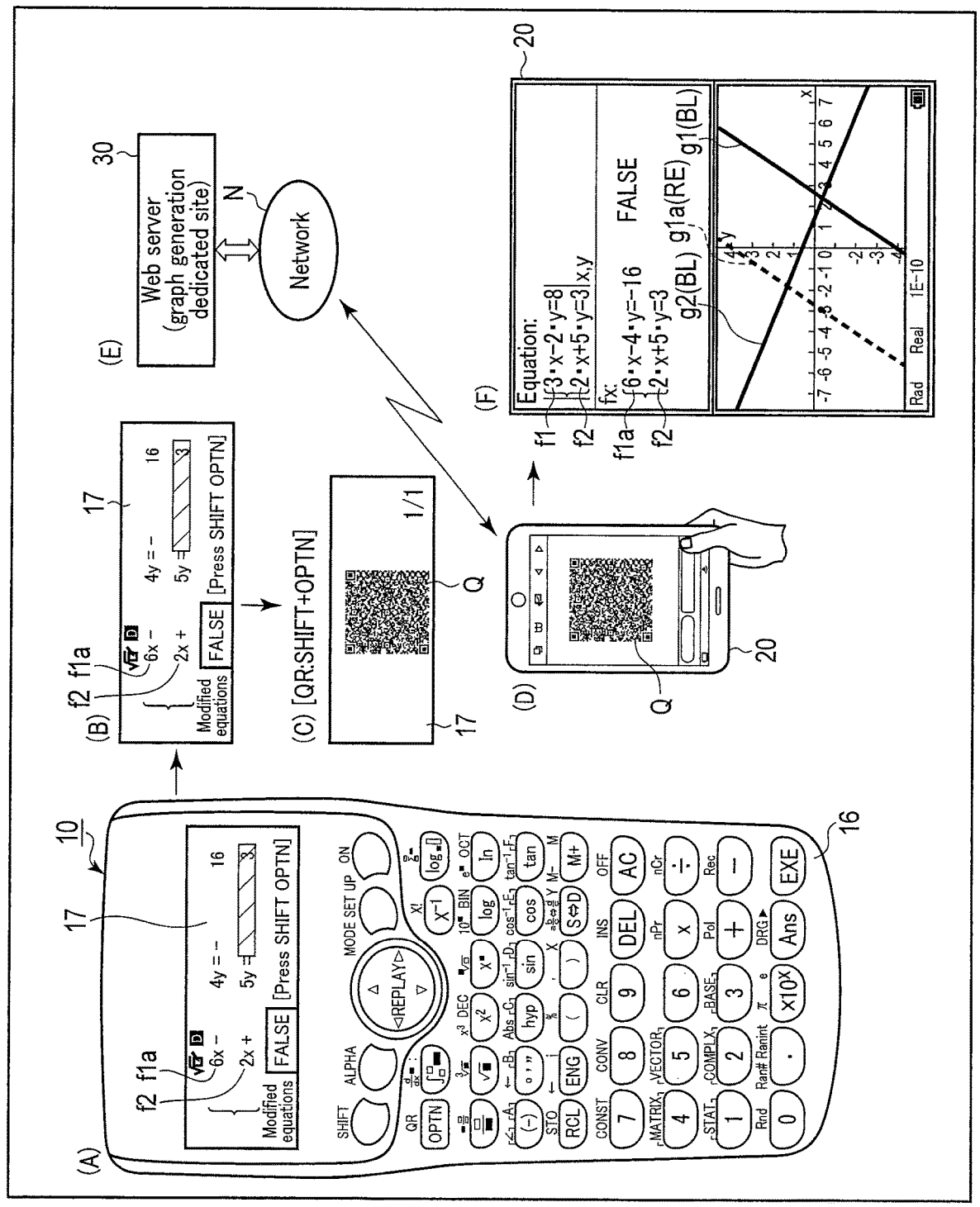
FIG. 5 is a drawing showing an overall configuration of a graph display system according to a second embodiment of the present invention in which the graphing scientific calculator 10, a portable device 20, and a graph generation dedicated site (Web server) 30 are operated in conjunction.

FIG. 5 is a drawing showing an overall configuration of the graph displaying system according to the second embodiment of the present invention in which the graphing scientific calculator (first electronic device) 10, the portable device (second electronic device) 20, and the graph generation dedicated site (Web server) 30 are operated in conjunction.

In the second embodiment, as shown in (A) to (C) of FIG. 5, data consisting of a problem equation that is input at the graphing scientific calculator 10 and related information thereof (an equation number), and data consisting of a modified equation and related information (an equation number, a result of true-false determination (TRUE/FALSE) thereof), as well as a URL of the graph generation dedicated site (Web server) 30, are converted into a two-dimensional code Q (QR code (registered trademark)) in accordance with user's operation, which is accepted after the equations are input, and the WR code Q is displayed on the display 17. The displayed QR code Q is photographed and read by the portable device 20 having a photographing function, a communication function, and a display function, such as a tablet terminal, as shown in (D) of FIG. 5. A Web browser is activated, and the portable device 20 transmits the data obtained by decoding the read QR code Q to the graph generation dedicated site 30, and receives image data of the graphs corresponding to the equations and generated in the dedicated site 30, as shown in (E) and (F) of FIG. 5.

Similarly to the first embodiment, it is thereby possible to display and check the graphs corresponding to the problem equation and modified equation on the portable device 20, allowing the user to easily visualize the graphs and to check whether the user's input modified equation corresponding to the problem equation is correct or not, without generating and displaying the graphs by the graphing scientific calculator 10 itself. In this case, there is no need of ensuring the graph display area Gg in the display 17 of the graphing scientific calculator 10, and a small screen size of the display 17 satisfies the needs.

Figures 6, 7:
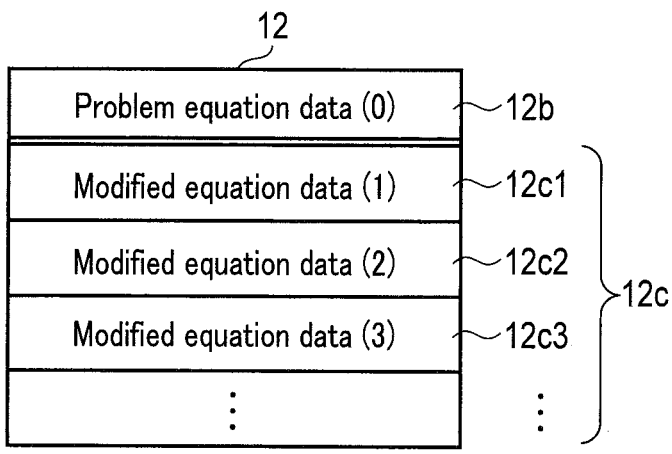
FIG. 6 is a drawing showing a problem equation data area 12b and a modified equation data area 12c in the second embodiment of the graphing scientific calculator 10.
FIG. 7 is a drawing showing a history data area 21 which is provided in a memory of the portable device 20.

FIG. 6 is a diagram showing the problem equation data area 12b and the modified equation data area 12c of the second modification of the graphing scientific calculator 10.

The problem equation data area 12b stores data of a problem equation in association with an equation number (0). The modified equation data area 12c has a plurality of the modified equation data area 12c1, 12c2, . . . , and every time a modified equation based on a problem equation stored in the problem equation data area 12b is input, data of the input modified equation is stored in each of the area 12c1, 12c2, . . . , in association with the equation numbers (1), (2), . . . , indicating the sequence from the problem equation, respectively.

Thus, when the data of the problem equation and related information thereof (the equation number and the coordinate range) and the data of each modified equation and related information (the equation number, the coordinate range, the result of true-false determination (TRUE/FALSE)) are transmitted to the graph generation dedicated site 30 by using the portable device 20, the equation associated with the equation number (0) can be determined and processed as a problem equation, and modified equations associated with the equation numbers (1), (2), . . . can be determined and processed as modified equations that are subsequently input based on the problem equation.

The modified equation data (1), (2), . . . , respectively stored in the area 12c1, 12c2, . . . of the modified equation data area 12c is erased and reset when the problem equation data (0) stored in the problem equation data area 12b is updated.

FIG. 7 is a drawing showing a history data area 21 which is allocated in the memory of the portable device 20.

The portable device 20 has, as explained in the above, a photographing function, a communication function, and a display function, and a dedicated application for photographing a QR code Q displayed on the graphing scientific calculator 10 and accessing the graph generation dedicated site (Web server) 30 is installed on the portable device 20.

When the QR code Q displayed on the display 17 of the graphing scientific calculator 10 is photographed and read, the history data area 21 stores, in accordance with the dedicated application, data consisting of the URL of the graph generation dedicated site that is obtained by decoding the read QR code Q, an equation included in an argument of the URL, a coordinate range, and a result of true-false determination (TRUE/FALSE) in association with an equation number and date and time.

The data after the equation number (1) stored in the history data area 21 is erased and reset when the data of the equation number (0) is updated.

FIG. 8 is a drawing showing the terminal data storage area 31 allocated in the memory of the graph generation dedicated site (Web server) 30.

When data from the portable device 20 is received, the terminal data storage area 31 stores an equation number, an equation, a coordinate range, and a result of true-false determination (TRUE/FALSE) included in the data in association with a terminal ID (terminal identification information) of the portable device 20.

The graph generation dedicated site 30 generates a graph corresponding to the equation based on the data stored in the terminal data storage area 31 (the equation number, the equation, the coordinate range, and the result of true-false determination (TRUE/FALSE)), and generates an image in which the drawing data of the equation and the generated graph, and TRUE or FALSE are spread onto one screen, and sends back the generated graph and image to the portable device 20 which is the access origin indicated by the terminal ID.

Next, the operation of the graph display system according to the configuration of the second embodiment in which the graphing scientific calculator 10, the portable device 20, and the graph generation dedicated site (Web server) 30 are operated in conjunction will be explained.

Figure 9:
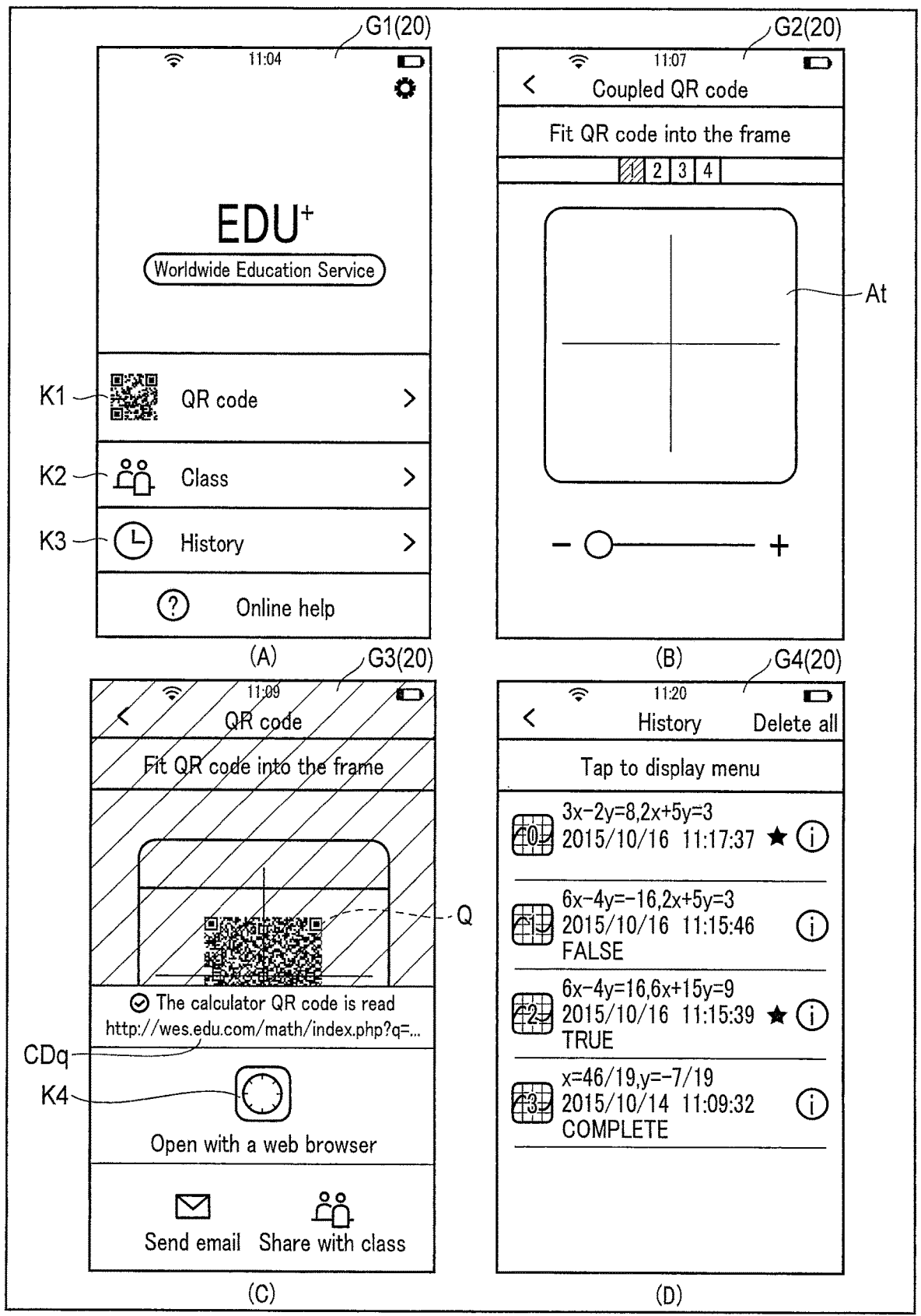
FIG. 9 is a drawing showing a display operation in accordance with a user's operation when a dedicated application is activated in the portable device 20.

FIG. 9 is a drawing showing a display operation in accordance with a user's operation when a dedicated application is activated on the portable device 20.

Figure 10:
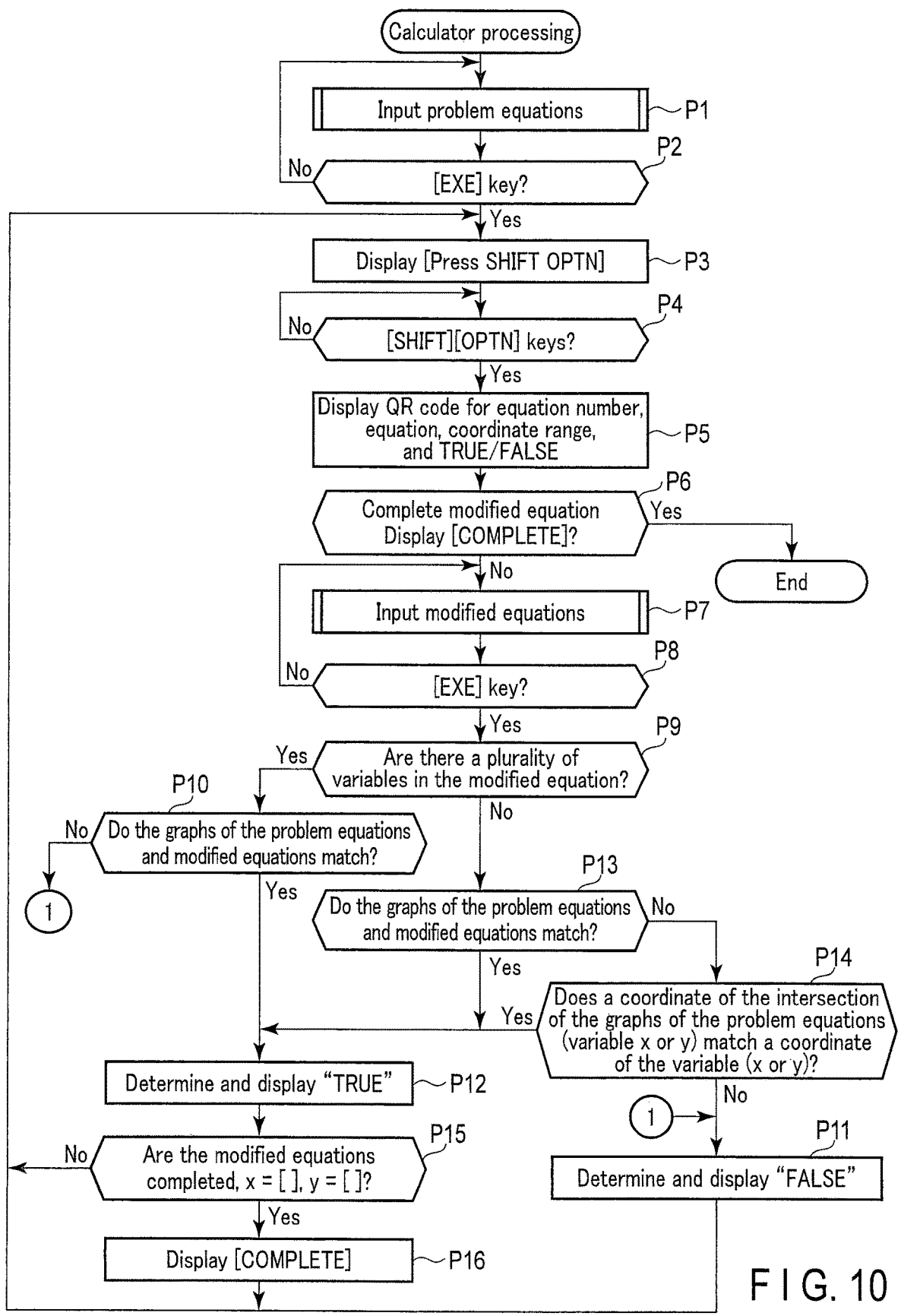
FIG. 10 is a flowchart showing a calculator process in the second embodiment of the graphing scientific calculator 10.

FIG. 10 is a flowchart showing a calculator process in the second embodiment of the graphing scientific calculator 10.

Figure 11:
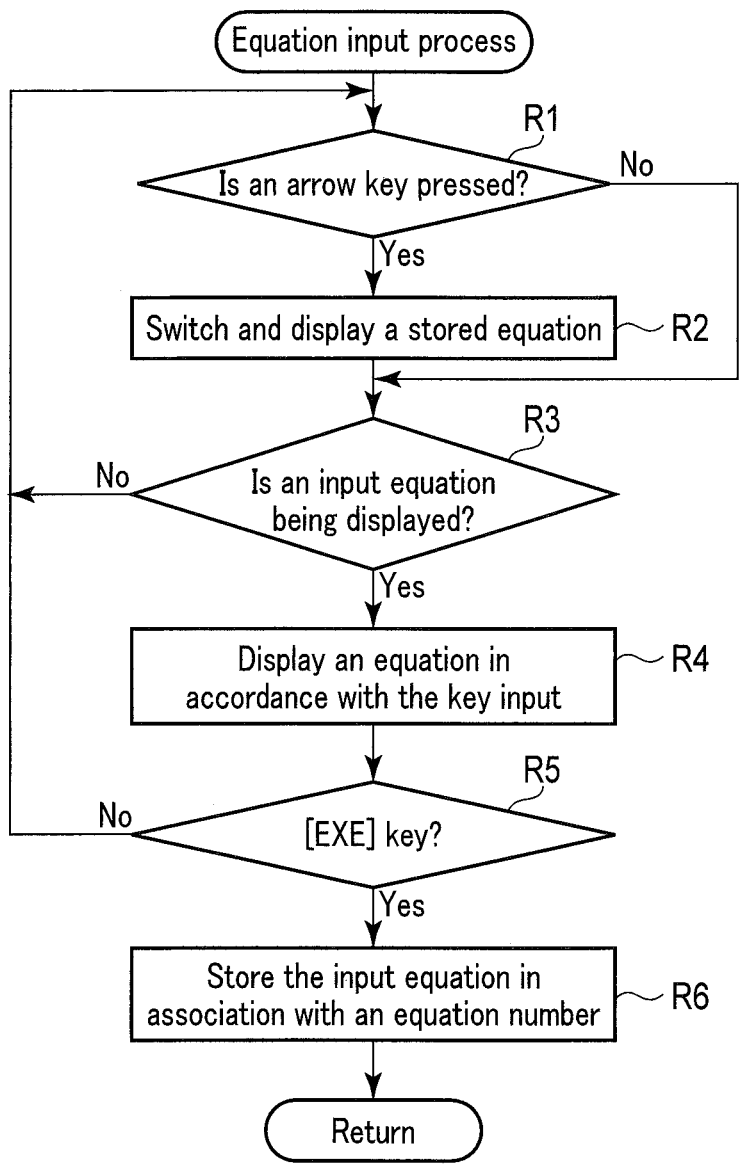
FIG. 11 is a flow chart showing an equation inputting process included in the calculator process in the second embodiment of the graphing scientific calculator 10.

FIG. 11 is a flowchart showing an equation inputting process included in the calculation processing in the second embodiment of the graphing scientific calculator 10.

Figure 12:
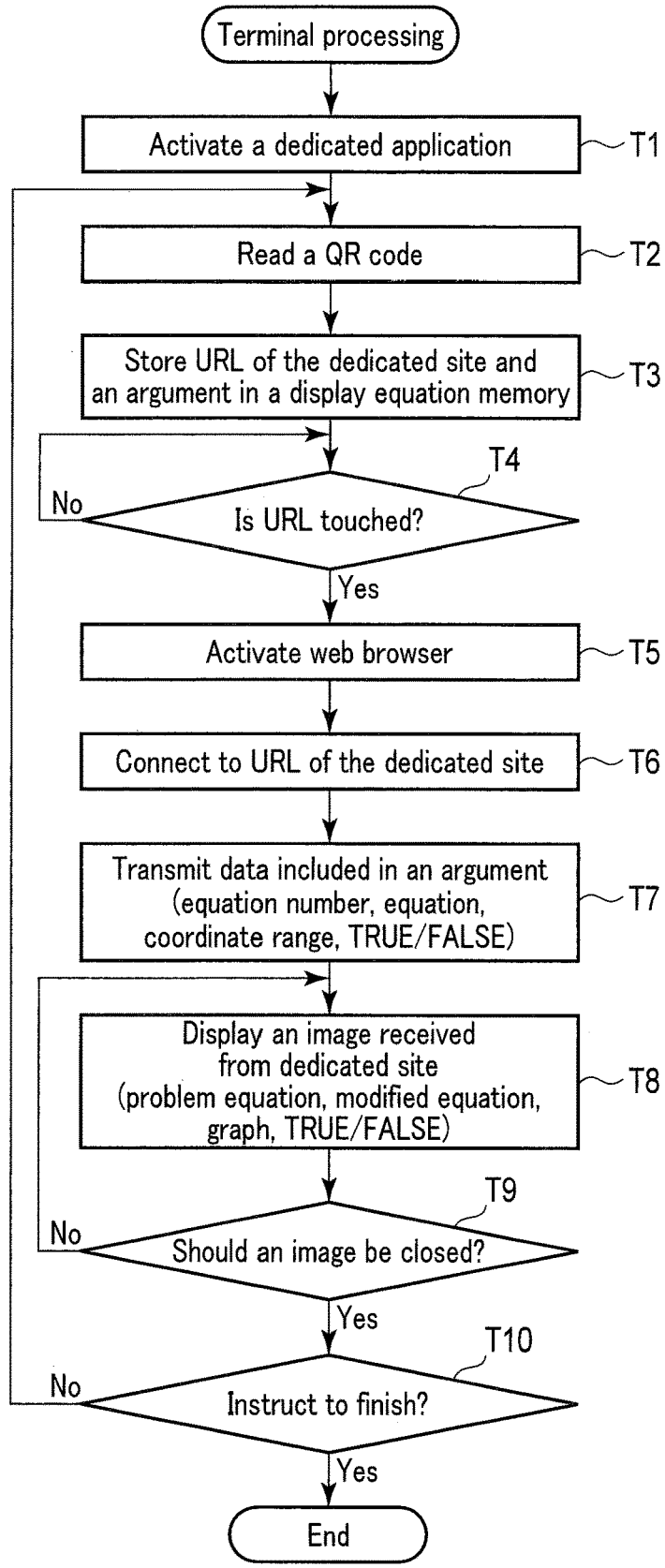
FIG. 12 is a flowchart showing a terminal process in the portable device 20.

FIG. 12 is a flowchart showing a terminal process in the portable device 20.

Figure 13:
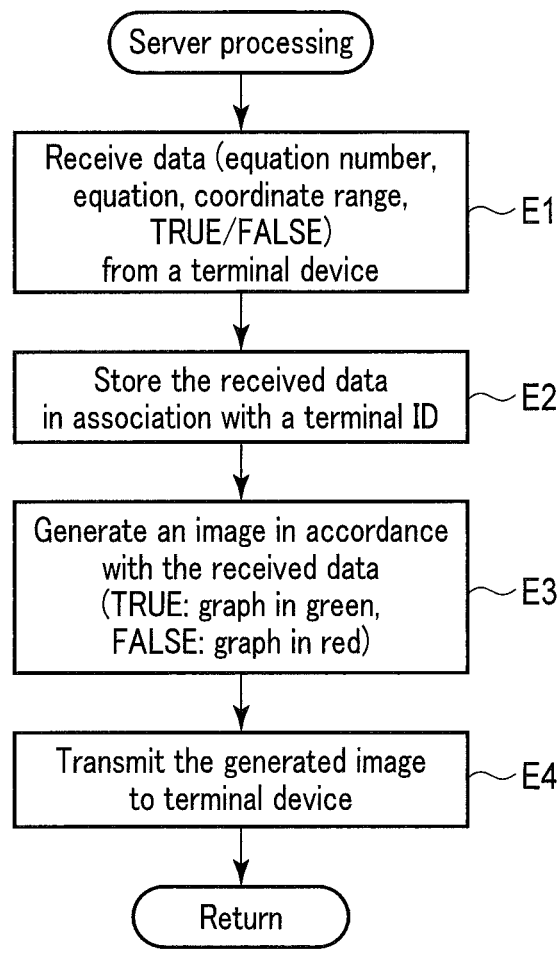
FIG. 13 is a flowchart showing a server process in the graph generation dedicated site (Web server) 30.

FIG. 13 is a flowchart showing a server process in the graph generation dedicated site (Web server) 30.

Figure 14:
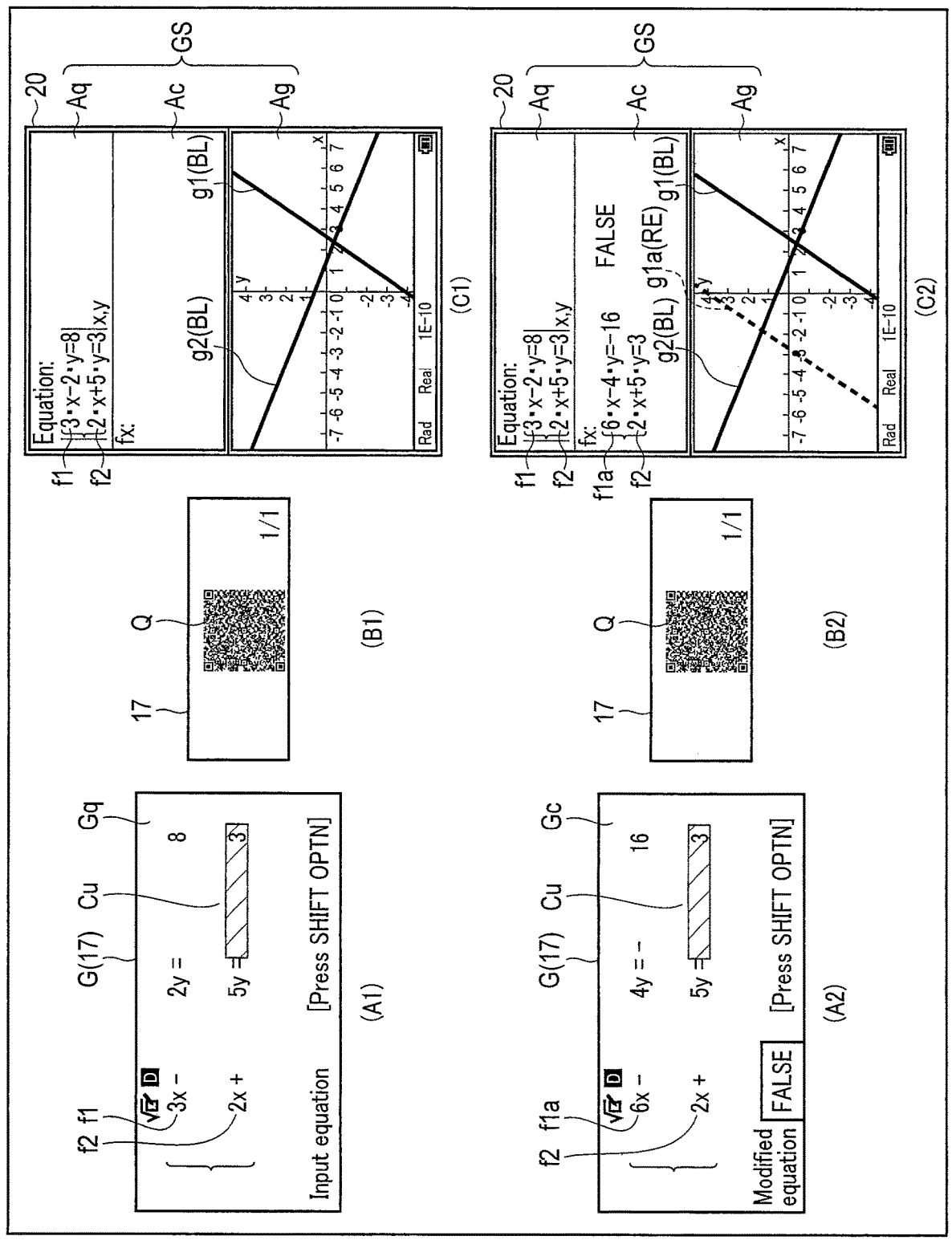
FIG. 14 is a drawing showing a display operation (part 1) in accordance with a user's operation using the graphing scientific calculator 10, the portable device 20, and the graph generation dedicated site (Web server) 30 in conjunction.

FIG. 14 is a drawing showing a display operation (part 1) in accordance with a user's operation using the graphing scientific calculator 10, the portable device 20, and the graph generation dedicated site (Web server) 30 in conjunction.

Figure 15:
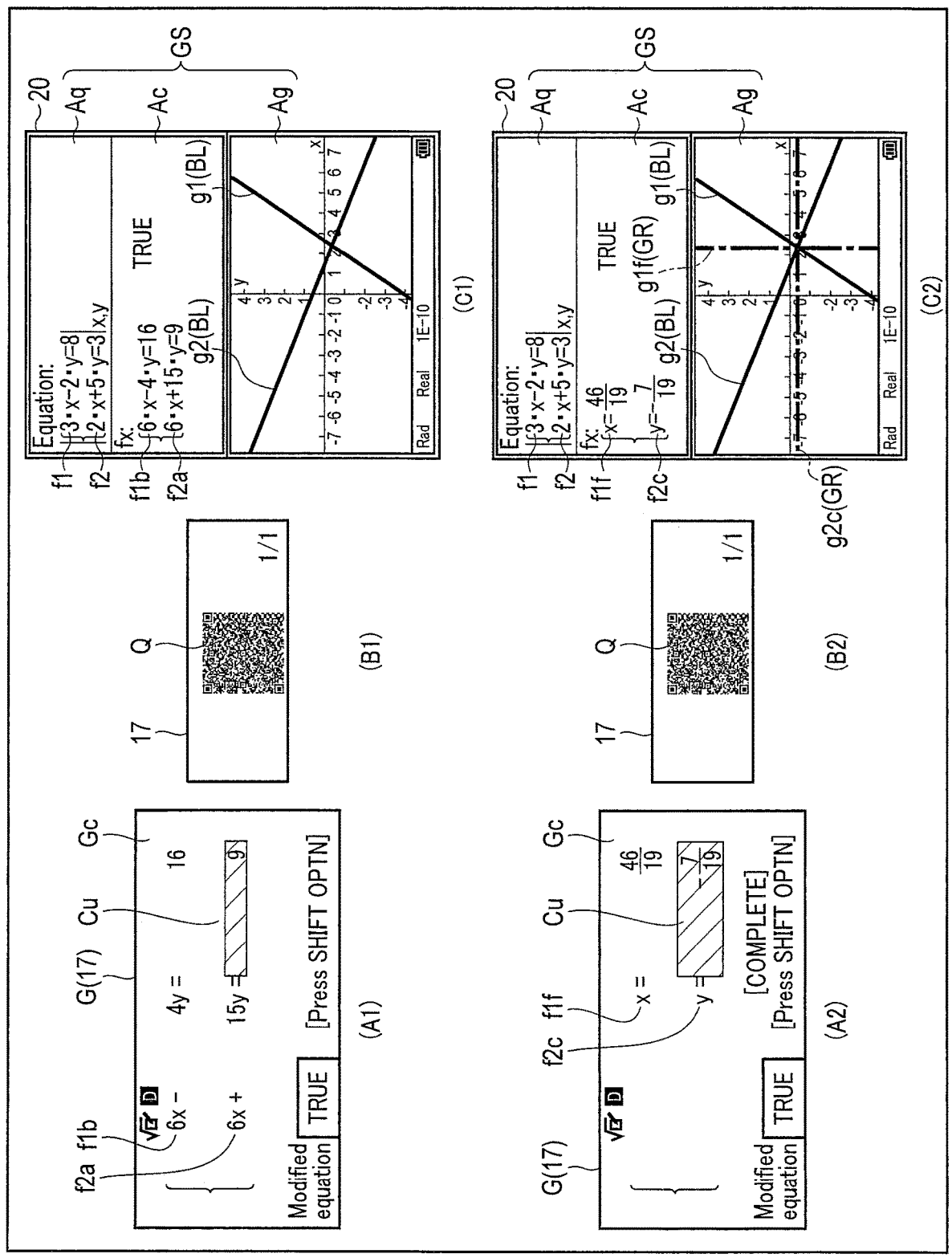
FIG. 15 is a drawing showing a display operation (part 2) in accordance with a user's operation using the graphing scientific calculator 10, the portable device 20, and the graph generation dedicated site (Web server) 30 in conjunction.

FIG. 15 is a drawing showing a display operation (part 2) in accordance with a user's operation using the graphing scientific calculator 10, the portable device 20, and the graph generation dedicated site (Web server) 30 in conjunction.

In this example, suppose the same equations (simultaneous equations with two unknowns) as the problem equations in the first embodiment are modified and solved in a manner similar to the first embodiment.

The size of the display screen of the display 17 of the graphing scientific calculator 10 is greatly smaller than that in the first embodiment; for example, suppose the display has a size that allows displaying of simultaneous equations, like the one shown in (A1) of FIG. 14.

Of the calculator processes in the second embodiment of the graphing scientific calculator 10 shown in FIG. 10, the process of determining true or false of a modified equation (step P9 through step P14) is the same as that included in the calculator process of the first embodiment shown in FIG. 2 (steps S4, S5 and S7 through S10); accordingly, the detailed description of the determination process will be omitted.

First, when the operation mode of the graphing scientific calculator 10 is set, in response to a user's operation of the key input unit 16, to a mode of calculating a solution to a mathematical equation, a calculation screen G which is allocated in the problem equation input area Gq is displayed on the display 17, as shown in (A1) of FIG. 14.

In accordance with the flowchart showing the equation input processing shown in FIG. 11, a cursor Cu indicating a data input position is displayed in the problem equation input area Gq in response to a user's operation of a cursor key of the key input unit 16, and a mathematical equation targeted for learning (a problem equation) is input (step P1).

In this example, the following set of simultaneous equations f1 and f2 with two unknowns, which are the same as those in the first embodiment, are input and displayed as problem equations.

$$3x-2y=8 \quad \text{f1}$$

$$2x+5y=3 \quad \text{f2}$$

Then, when the input of the simultaneous equations f1 and f2 as problem equations is determined in response to a user's operation of the [EXE] key in the key input unit 16, the equations (problem equations) f1 and f2 are stored in the problem equation data area 12b in the memory 12 in association with the equation number (0) (step P2 (R1 and R3 to R5)). Solutions to the variables x and y of the equations f1 and f2 (problem equations) are calculated, and a two-degree coordinate range (coordinate system) including the coordinates of the calculated solutions to x and y are set and stored in the coordinate setting data area 12d.

When a plurality of equations are stored in the problem equation data area 12b, upon an operation of the arrow keys in the key input unit 16 (Yes in step R1), the plurality of equations stored in the problem equation data area 12b are switched at every operation of the arrow keys and are read in turn, and displayed in the problem equation input area Gq as a problem equation (step R2).

While displaying, as a problem equation, a newly key-input equation, a stored equation that is read in response to an operation of the arrow keys, or a newly key-input equation based on the stored equations (Yes in step R3, then step R4), the [EXE] key in the key input unit 16 is operated, and an input of the equation as the displayed problem equation is determined (Yes in step R5), the input equation is associated with the equation number (0) and stored in the problem equation data area 12b (step R6).

As shown in (A1) of FIG. 14, when the input of the simultaneous equations f1 and f2 as the problem equations displayed in the problem equation input area Gq is determined (step P1 and step P2), a key input message "[Press SHIFT OPTN]" is displayed in an available area in the problem equation input area Gq to prompt the user to press down the [SHIFT] key and the [OPTN] key (step P3). The [SHIFT] key is used for switching the functions of the keys arranged in the key input unit 16 from the functions inscribed on the key tops to the functions as inscribed next to the keys on the calculator itself. There is the indication [QR] above the [OPTN] key to instruct the user to convert a mathematical equation being displayed into a two-dimensional code (QR code), and the key functions as the [QR] key when the [SHIFT] key and the [OPTN] key are pressed down together.

When the [SHIFT] key and the [OPTN] key ([QR] key) are pressed down together (Yes in step P4), the data of the equations f1 and f2 as problem equations stored in the problem equation data area 12b and their equation number (0), and the data of two-degree coordinate range stored in the coordinate setting data area 12d are converted, as well as the URL of the graph generation dedicated site (Web server) 30, into a QR code Q and displayed on the display 17, as shown in (B1) of FIG. 14 (step P5).

In the portable device 20, when the dedicated application is activated, for example, an initial screen G1 of the dedicated application is displayed in the touch-panel display of the portable device 20, as shown in (A) of FIG. 9 (step T1). In the initial screen G1 of the dedicated application, the [QR code] key K1, the [class] key K2, and the [history] key K3 are provided.

When the [QR code] key K1 of the initial screen G1 is touch-operated, a QR reader screen G2 with a QR code reader frame At is displayed as shown in (B) of FIG. 9. As shown in (C) of FIG. 9, the QR code Q displayed in the display 17 of the graphing scientific calculator 10 (see (B1) of FIG. 14) is photographed so as to fit in the QR code reader frame At, the QR code Q is read and decoded (step T2), and then, a read code CDq ("http://wes.edu.com/math/index . . . ") including the URL of the graph generation dedicated site and its argument (the problem equations f1 and f2, the equation number (0), and the coordinate range) that are decoded are displayed in the QR decoding screen G3. The data of the URL of the graph generation dedicated site and an argument of the URL (the problem equations f1 and f2, the equation number (0), and the coordinate range) included in the read code CDq is stored in the history data area 21 (see FIG. 7) in association with the equation number (0) and a current time and date (step T3).

Herein, when the [Browse] key K4, which is provided in correspondence to the read code CDq including the URL of the graph generation dedicated site displayed in the portable device 20, is touch-operated (Yes in step T4), the Web browser is activated (step T5) and connected to the graph generation dedicated site (Web server) 30 (step T6).

Then, the data of the problem equations f1 and f2, the equation number (0), and the coordinate range, which are included in the argument of the URL of the graph generation dedicated site is transmitted to the connected graph generation dedicated site (Web server) 30 (step T7).

In the graph generation dedicated site (Web server) 30, when the data of the problem equations f1 and f2, the equation number (0), and the coordinate range transmitted from the portable device 20 are received (step E1), the received data is associated with a terminal ID of the portable device 20 as an origin of the data transmission, and is stored in the terminal data storage area 31 (see FIG. 8) (step E2).

Then, in the graph generation dedicated site 30, the graph generation screen GS in which the top part is allocated for the problem equation area Aq, the middle part is allocated for the modified equation area Ac, and the bottom part is allocated for the graph area Ag in accordance with the screen size of the touch-panel display of the portable device 20 (see (C1) of FIG. 14) are reserved in an internal image memory. An image of the graph generation screen GS is generated by displaying the equations f1 "3x−2y=8" and f2 "2x+5y=3" as problem equations stored in the terminal data storage area 31 in the problem equation area Aq, generating graph equations for drawing graphs corresponding to the equations f1 and f2 as problem equations in the coordinate range, and drawing the graph g1 corresponding to the equation f1 and the graph g2 corresponding to the equation f2 in blue BL in the graph area Ag (step E3).

The generated image data of the graph generation screen GS is transmitted to the portable device 20 which is the transmission origin of the data (step E4).

In the portable device 20, when the image data of the graph generation screen GS generated by the graph generation dedicated site 30 is received, the image data is displayed on the touch-panel display as shown in (C1) of FIG. 14 (step T8).

Thus, in the second embodiment, the graphs g1 and g2 corresponding to the simultaneous equations f1 and f2 as problem equations are displayed in the portable device 20, and thereby the user is easily able to visualize the relationship between the variables x and y included in the equations f1 and f2, similar to the first embodiment.

Subsequently, in accordance with the flowchart showing the equation input process shown in FIG. 11, a cursor Cu indicating a data input position is displayed in the modified equation input area Gc in response to a user's operation of a cursor key of the key input unit 16, and modified equations for the equations f1 and f2 as the problem equations are input (step P7). More specifically, as shown in (A2) of FIG. 14, in the modified equation input area Gc which is set in the display 17, the modified equation f1a "6x−4y=−16" which is obtained by modifying the equation f1 "3x−2y=8" is first input and displayed in response to a user's operation (step P7). At this time, the modified equation f1a "6x−4y=−16" and the equation f2 "2x+5y=3" are displayed in the modified equation input area Gc.

Then, when the input of the modified equation f1a is determined in response to a user's operation of the [EXE] key in the key input unit 16, the modified equation f1a is stored in the modified equation data area 12c1 in the memory 12 in association with the equation number (1) (step P8 (R1 and R3 through R5)). Solutions to the variables x and y of the equations (modified equations) f1a and f2 are calculated, and a two-degree coordinate range (coordinate system) including the coordinate of the solutions to the variables x and y is set and stored in the coordinate setting data area 12d.

A plurality of equations (in the case of simultaneous equations, a set is regarded as one equation) are stored in the modified equation data area 12c, and when the arrow keys in the key input unit 16 are operated (Yes in step R1), the equations stored in the modified equation data area 12c are subsequently switched and read each time the arrow keys are operated, and the read equation is displayed in the modified equation input area Gc as a modified equation (step R2).

While displaying, as a modified equation, a newly key-input equation, a stored equation that is read in response to an operation of the arrow keys, or a newly key-input equation based on the stored equations (Yes in step R3, then step R4), the [EXE] key in the key input unit 16 is operated, and an input of the equation as the displayed modified equation is determined (Yes in step R5), and the equation is associated with the equation number (n) in accordance with the order of inputting the modified equations and is stored in the problem equation data area 12c (step R6).

As shown in (A2) of FIG. 14, when the input of the modified equation f1a "6x−4y=−16" displayed in the modified equation input area Gc is determined (step P7 and step P8), similarly to the process of determining true or false of the modified equation in the first embodiment (step S4 and step S5) (see (A) of FIG. 3), it is determined that there are two variables (x and y) in the modified equation f1a "6x−4y=−16" (Yes in step P9), and it is determined that the graph equation corresponding to the modified equation f1a "6x−4y=−16" does not match the graph equation corresponding to the equation f1 "3x−2y=8" stored in the graph equation data area 12e, and the graphs corresponding to the equation f1 and the modified equation f1a are not identical (No in step P10).

Then, in the modified equation input area Gc to which the modified equation f1a "6x−4y=−16" is input, an error message "FALSE" is displayed to notify the user that the modified equation f1a is incorrect (step P11).

In the available area in the modified equation input area Gc, an input message "[Press SHIFT OPTN]" is displayed to prompt the user to press down the [SHIFT] key and the [OPTN] key (step P3).

When the [SHIFT] key and the [OPTN] key ([QR] key) are pressed down together (Yes in step P4), the data of the modified equation f1a "6x−4y=−16" stored in the modified equation data area 12c1 and its equation number (1), and the data of a two-degree coordinate range stored in the coordinate setting data area 12d and a result of the true-false determination on the modified equation f1a ("FALSE") are converted, as well as a URL of the graph generation dedicated site (Web server) 30, into a QR code Q and displayed on the display 17, as shown in (B2) of FIG. 14 (step P5).

In the portable device 20, when the graph generation screen GS corresponding to the displayed equations f1 and f2 as problem equations as shown in (C1) of FIG. 14 is closed (Yes in step T9), the initial screen G1 of the dedicated application shown in (A) of FIG. 9 is re-displayed, and when the [QR code] key K1 is touch-operated, the QR reader screen G2 in which the QR code reader frame At is provided is re-displayed as shown in (B) of FIG. 9. Furthermore, as shown in (C) of FIG. 9, the QR code Q displayed in the display 17 of the graphing scientific calculator 10 (see (B2) of FIG. 14) is photographed so as to fit in the QR code reader frame At, the QR code Q is read and decoded (step T2), and then, a read code CDq ("http://wes.edu.com/math/ . . . ") including the URL of the graph generation dedicated site and the argument of the URL (the modified equation f1$a$, the equation number (1), the coordinate range, the result of true-false determination ("FALSE")) that are decoded are displayed in the QR decoding screen G3. The data of the URL of the graph generation dedicated site and its argument (the modified equation f1$a$, the equation number (1), the coordinate range, and the result of true-false determination ("FALSE")) included in the read code CDq is stored in the history data area 21 (see FIG. 7) in association with the equation number (1) and a current time and date (step T3).

Herein, when the [Browse] key K4, which is provided in correspondence to the read code CDq including the URL of the graph generation dedicated site displayed in the portable device 20, is touch-operated (Yes in step T4), the Web browser is activated (step T5) and connected to the graph generation dedicated site (Web server) 30 (step T6).

Then, the data of the modified equation f1$a$, the equation number (1), the coordinate range, a result of true-false determination ("FALSE"), which are included in the argument of the URL of the graph generation dedicated site is transmitted to the connected graph generation dedicated site (Web server) 30 (step T7).

In the graph generation dedicated site (Web server) 30, when the data of the modified equation f1$a$, the equation number (1), the coordinate range, the result of true-false determination ("FALSE") which are transmitted from the portable device 20 is received (step E1), the received data is stored in the terminal data storage area 31 (see FIG. 8) in association with the terminal ID of the portable device 20 as an origin of the data transmission (step E2).

Then, in the graph generation dedicated site 30, an image for the graph generation screen GS is generated by drawing the modified equation f1$a$ "6x−4y=−16" and the equation f2 "2x+5y=3" stored in the terminal data storage area 31, and an error message "FALSE" to notify the user that the modified equation f1$a$ is incorrect in the modified equation area AC allocated in the graph generation screen GS (see (C2) of FIG. 14) which is reserved in the internal image memory, and distinguishably drawing the graph g1$a$ in red RE based on a graph equation corresponding to the modified equation f1$a$ in the coordinate range of the graph area Ag where the graphs g1 and g2 in blue BL corresponding to the equations f1 and f2 as the problem equations are drawn (step E3).

The generated image data of the graph generation screen GS is transmitted to the portable device 20 which is the transmission origin of the data (step E4).

In the portable device 20, when the image data of the graph generation screen GS generated by the graph generation dedicated site 30 is received, the received image data is displayed on the touch-screen display as shown in (C2) of FIG. 14 (step T8).

In the second embodiment, in the graphing scientific calculator 10 and the portable device 20 the user can thereby immediately know that the user's input modified equation f1$a$ "6x−4y=−16" is incorrect, and easily visualize how the modified equation f1$a$ "6x−4y=−16" is incorrect based on a difference between the distinguished graph g1$a$ shown in red RE in the portable device 20 corresponding to the modified equation f1$a$ and the graph g1 drawn in blue BL corresponding to the equation f1.

Next, regarding the modified equation f1$a$ "6x−4y=−16", when a user's corrected modified equation f1$b$ "6x−4y=16" is input and displayed in the graphing scientific calculator 10, as shown in (A1) of FIG. 15 (step P7 and step P8), it is determined whether the graphs of the equation f1 "3x−2y=8" and the corrected modified equation f1$b$ "6x−4y=16" are identical or not in a manner similar to the previous determination, and it is determined whether the modification of the modified equation f1$b$ is correct or not (step P9, then step P10).

Then, if it is determined that the graph corresponding to the equation f1 "3x−2y=8" is identical to the graph corresponding to the corrected equation f1$b$ "6x−4y=16" (Yes in step P10), a message "TRUE" is displayed in the modified equation input area Gc to which the corrected modified equation f1$b$ "6x−4y=16" has been input to notify the user that the modified equation f1$b$ is determined to be correct, as shown in (A1) of FIG. 15 (step P12).

Then, it is determined whether or not the modified equations displayed as "TRUE" in the modified equation input area Gc are final forms of the equations f1 and f2, x=[ ] and y=[ ]; if not (No in step P15), a key input message "[Press SHIFT OPTN]" is re-displayed in the available area of the modified equation input area Gc to prompt the user to press down the [SHIFT] key and the [OPTN] key together (step P3).

When the [SHIFT] key and the [OPTN] key ([QR] key) are pressed down together (Yes in step P4), the data of the modified equation f1$b$ "6x−4y=16" stored in the modified equation data area 12$c$2 and its equation number (2), and the data of a two-degree coordinate range stored in the coordinate setting data area 12$d$, and a result of true-false determination on the modified equation f1$b$ ("TRUE") are converted, as well as a URL of the graph generation dedicated site (Web server) 30, into a QR code Q and displayed on the display 17, similarly to the above, as shown in (B1) of FIG. 15 (step P5).

In the portable device 20, similarly to the above, when the QR code Q displayed in the display 17 of the graphing scientific calculator 10 is photographed and read, the portable device 20 is connected to the URL of the graph generation dedicated site which is obtained by decoding the QR code Q, and data of an argument of the URL (the modified equation f1$b$, the equation number (2), the coordinate range, and the result of true-false determination ("TRUE")) is transmitted to the graph generation dedicated site (Web server) 30 (step T2 to step T7).

In the graph generation dedicated site (Web server) 30, the data of the corrected modified equation f1$b$, the equation number (2), the coordinate range, the result of true-false determination ("TRUE") that are transmitted from the portable device 20 is received (step E1), the corrected modified equation f1$b$ "6x−4y=16" and a message "TRUE" to notify the user that the corrected modified equation f1$b$ is correct are drawn in the modified equation area Ac in the graph generation screen GS reserved in the internal image memory (see (C1) of FIG. 15). At this time, the graph corresponding to the corrected modified equation f1$b$ "6x−4y=16" is identical to the graph g1 corresponding to the equation f1 "3x−2y=8" which has already been drawn in the graph area Ag of the graph generation screen GS (see (C1) of FIG. 15); thus, the graph corresponding to the modified equation f1$b$ is not drawn (step E2 and step E3). The user may be notified that the equation f1 and the corrected equation f1$b$ are mathematically identical by changing the display of the graph g1 with time. More specifically, the graph g1 may be displayed by flashing, or displayed in different colors which are switched from one to another, or displayed in different thickness or in different types of line, to make variations in the display with time. Then, the generated image data of the graph generation screen GS is transmitted to the portable device 20 which is the transmission origin of the data (step E4). Thus, if the equations are mathematically identical, the graph corresponding to the modified equation is displayed overlapping the original equation which is a target for equation modification, and the former serves as the latter.

In the portable device 20, when the image data of the graph generation screen GS generated by the graph generation dedicated site 30 is received similarly to the above, the image data is displayed on the touch-panel display as shown in (C1) of FIG. 15 (step T8).

Next, similarly to the above, regarding the equation f2 "2x+5y=3", when the modified equation f2a "6x+15y=9" is input and displayed in the graphing scientific calculator 10 in accordance with a user's operation as shown in (A1) of FIG. 15 (step P7 and step P8), it is determined whether the graphs of the equation f2 "2x+5y=3" and the modified equation f2a "6x+15y=9" are identical or not, and it is determined whether the modification of the modified equation f2a is correct or not (step P9, then step P10).

Then, if it is determined that the graph corresponding to the equation f2 "2x+5y=3" is identical to the graph corresponding to the corrected equation f2a "6x+15y=9" (Yes in step P10), a message "TRUE" is displayed in the modified equation input area Gc to which the corrected modified equation f2a has been input to notify the user that the modified equation f2a is determined to be correct as shown in (A1) of FIG. 15 (step P12).

Then, similarly, the key input message "[Press SHIFT OPTN]" is re-displayed in the available area in the modified equation input area Gc (No in step P15, then step P3).

When the [SHIFT] key and the [OPTN] key ([QR] key) are pressed down together (Yes in step P4), the data of the modified equation f2a "6x+15y=9" stored in the modified equation data area 12c2 and its equation number (2), and the data of a two-degree coordinate range stored in the coordinate setting data area 12d, and the result of true-false determination on the modified equation f2a ("TRUE") are converted, as well as the URL of the graph generation dedicated site (Web server) 30, into a QR code Q and displayed on the display 17, as shown in (B1) of FIG. 15 (step P5).

In the portable device 20, similarly to the above, when the QR code Q displayed in the display 17 of the graphing scientific calculator 10 is photographed and read, the portable device 20 is connected to the URL of the graph generation dedicated site which is obtained by decoding the QR code Q, and data of an argument of the URL (the modified equation f2a, the equation number (2), the coordinate range, and the result of true-false determination ("TRUE")) is transmitted to the graph generation dedicated site (Web server) 30 (step T2 through step T7).

In the graph generation dedicated site (Web server) 30, when the data transmitted from the portable device 20, i.e., the modified equation f2a, the equation number (2), the coordinate range, and the result of true-false determination ("TRUE"), is received (step E1), the modified equation f2a "6x+15y=9" and a message "TRUE" to notify the user that the modified equation f2a is correct are drawn in the modified equation area Ac in the graph generation screen GS (see (C1) of FIG. 15) reserved in the internal image memory. Also in this case similarly to the above, the graph corresponding to the modified equation f2a "6x+15y=9" is identical to the graph g2 corresponding to the equation f2 "2x+5y=3" which has already been drawn in the graph area Ag of the graph generation screen GS (see (C1) of FIG. 15), overlapping the graph g2; thus, the graph corresponding to the modified equation f2a is not drawn (step E2 and step E3). Then, the generated image data of the graph generation screen GS is transmitted to the portable device 20 which is the transmission origin of the data (step E4).

In the portable device 20, when the image data of the graph generation screen GS generated by the graph generation dedicated site 30 is received similarly to the above, the image data is displayed on the touch-panel display as shown in (C1) of FIG. 15 (step T8).

It is thereby possible for the user, similarly to the first embodiment, to immediately know that the user's input modified equations f1b "6x−4y=16" and f2a "6x+15y=9" are correct, and to easily visualize the graphs corresponding to the modified equations f1b and f2a identical to and overlapping the graphs g1 and g2 drawn in blue BL corresponding to the equations f1 and f2.

Thereafter, in the graphing scientific calculator 10, as shown in (A2) of FIG. 15, in accordance with a user's operation, a modified equation f1f "x=46/19", which is a final modification of the original equation f1 "3x−2y=8" which has been modified in stages (f1a to f1e), and a modified equation f2c "y=−(7/19)", which is a final modification of the original equation f2 "2x+5y=3" which has been modified in stages (f2a to f2b) are subsequently input (step P7 and step P8), similarly to the first embodiment, it is determined that whether the coordinates (x) and (y) of the intersection of the graphs g1 and g2 match the coordinates the solutions to the variables x and y included in the final-stage modified equations f1f and f2c (Yes in step P14), and a message "TRUE" to notify the user that the modified equations f1f and f2c are correct is displayed in the modified equation input area Gc to which the modified equations f1f and f2c are input (step P12).

It is determined that the modified equations f1f and f2c displayed as "TRUE" in the modified equation input area Gc are final forms of the equations f1 and f2, x=[ ] and y=[ ] (Yes in step P15), and a message "COMPLETE" to notify that the completion of the modified equations is displayed in the modified equation input area Gc (step P16).

Then, similarly to the above, a key input message "[Press SHIFT OPTN]" is re-displayed in the available area in the modified equation input area Gc (step P3).

When the [SHIFT] key and the [OPTN] key ([QR] key) are pressed down together (Yes in step P4), the data of the final modified equations f1f "x=46/19" and f2c "y=−(7/19)" stored in the modified equation data area 12c and their equation numbers, a coordinate range, and a result of true-false determination ("TRUE") is converted similarly to the above, as well as a URL of the graph generation dedicated site (Web server) 30, into a QR code Q and displayed on the display 17, as shown in (B2) of FIG. 15 (step P5).

In the portable device 20, similarly to the above, when the QR code Q displayed in the display 17 of the graphing scientific calculator 10 is photographed and read, the portable device 20 is connected to the URL of the graph generation dedicated site which is obtained by decoding the QR code Q, and data of an argument of the URL (the modified equations f1f and f2c, the equation number, the coordinate range, and the result of true-false determination ("TRUE")) is transmitted to the graph generation dedicated site (Web server) 30 (step T2 to step T7).

When the data of the final modified equations f1f and f2c, the equation numbers, the coordinate range, and the result of true-false determination ("TRUE") that are transmitted from the portable device 20 is received in the graph generation dedicated site (Web server) 30 (step E1), the final modified equations f1ƒ "x=46/19" and f2c "y=−(7/19)" and a message "TRUE" to notify the user that the modified equations f1ƒ and f2c are correct are drawn in the modified equation area Ac in the graph generation screen GS (see (C2) in FIG. 15) reserved in the internal image memory. An image for the graph generation screen GS is generated by distinguishably drawing, based on the graph equations corresponding to the modified equations f1ƒ and f2c, the graph g1ƒ corresponding to the modified equation f1ƒ and the graph g2c corresponding to the modified equation f2c in green GR in the coordinate range where the graphs g1 and g2 corresponding to the equations f1 and f2 as problem equations are drawn in blue BL, the graph g1ƒ being orthogonal to the coordinate axis x and the graph g2c being orthogonal to the coordinate axis y and corresponding to the modified equation f2c, both of the graphs g1ƒ and g2c intersecting the intersection of the graphs g1 and g2 (step E3).

Then, the generated image data of the graph generation screen GS is transmitted to the portable device 20 which is the transmission origin of the data (step E4).

In the portable device 20, similarly to the above, when the image data of the graph generation screen GS generated by the graph generation dedicated site 30 is received, the image data is displayed on the touch-panel display as shown in (C2) of FIG. 15 (step T8).

Similarly to the first embodiment, it is thereby possible for the user to immediately know that the modified equations f1ƒ and f2c are correct even when the graphs g1ƒ and g2c corresponding to the user's input modified equations f1ƒ and f2c (equations with one unknown) are not identical to the graphs g1 and g2 corresponding to the equations f1 and f2, and to easily check that the coordinate value of the intersection of the graphs g1, g2, g1ƒ and g2c are the solutions to the equations f1 and f2.

In the portable device 20, the dedicated application is activated, and the initial screen G1 is displayed as shown in (A) of FIG. 9, and when the [history] key K3 provided in the initial screen G1 is touch-operated, the history data list screen G4 is displayed as shown in (D) of FIG. 9.

In the history data list screen G4, in step T3 of the terminal process (see FIG. 12), time and date, mathematical equations, such as problem equations and modified equations stored in association with equation numbers, and results of true-false determination (TRUE/FALSE) are read to the history data area 21 in the memory (see FIG. 7), and each of the read-out equations are listed and displayed along with its equation number, time and date, and a result of true-false determination (TRUE/FALSE).

By displaying the history data list screen G4, the user can easily check equations as problem equations that have been input in the past, modified equations that have been input in stages in correspondence to the problem equations, and results of true-false determination on the modified equations.

In the portable device 20, when the screens G2 to G4 being displayed as shown in (B) to (D) of FIG. 9 are closed and the display is returned to the initial display screen G1 (Yes in step T9), if a user's operation to instruct finishing the dedicated application is input (Yes in step T10), the terminal process that has been performed in accordance with the dedicated application is finished.

Therefore, in the graph display system according to the second embodiment in which the graphing scientific calculator 10, the portable device 20, and the graph generation dedicated site (Web server) 30 are operated in conjunction, the graphs corresponding to the problem equation and modified equation are displayed on the portable device 20, thereby allowing the user to easily check whether the user's input modified equation corresponding to the problem equation is correct or not through visualizing the graphs, without generating and displaying the graphs by the graphing scientific calculator 10 itself, similarly to the first embodiment.

Not being limited to the above-described first and second embodiments, various input operations and displays may be carried out on a Web browser which operates on a general-purpose personal computer (first electronic device) PC, and an Internet server apparatus connected to the personal computer PC via the Internet may perform various input operations, as will be explained in the third embodiment below. In this case, for example, the Web browser accepts an input of a modified equation, but does not perform a true-false determination, and transmits a problem equation and the input modified equation to the server apparatus on the Internet. The server apparatus which has received the problem equation and the input modified equation determines whether the modified equation is true or false, generates an image in accordance with a result of the determination, and transmits the image information to the Web browser. The Web browser may carry out a display on the display of the personal computer PC in accordance with the received image information.

Third Embodiment

Figure 16:
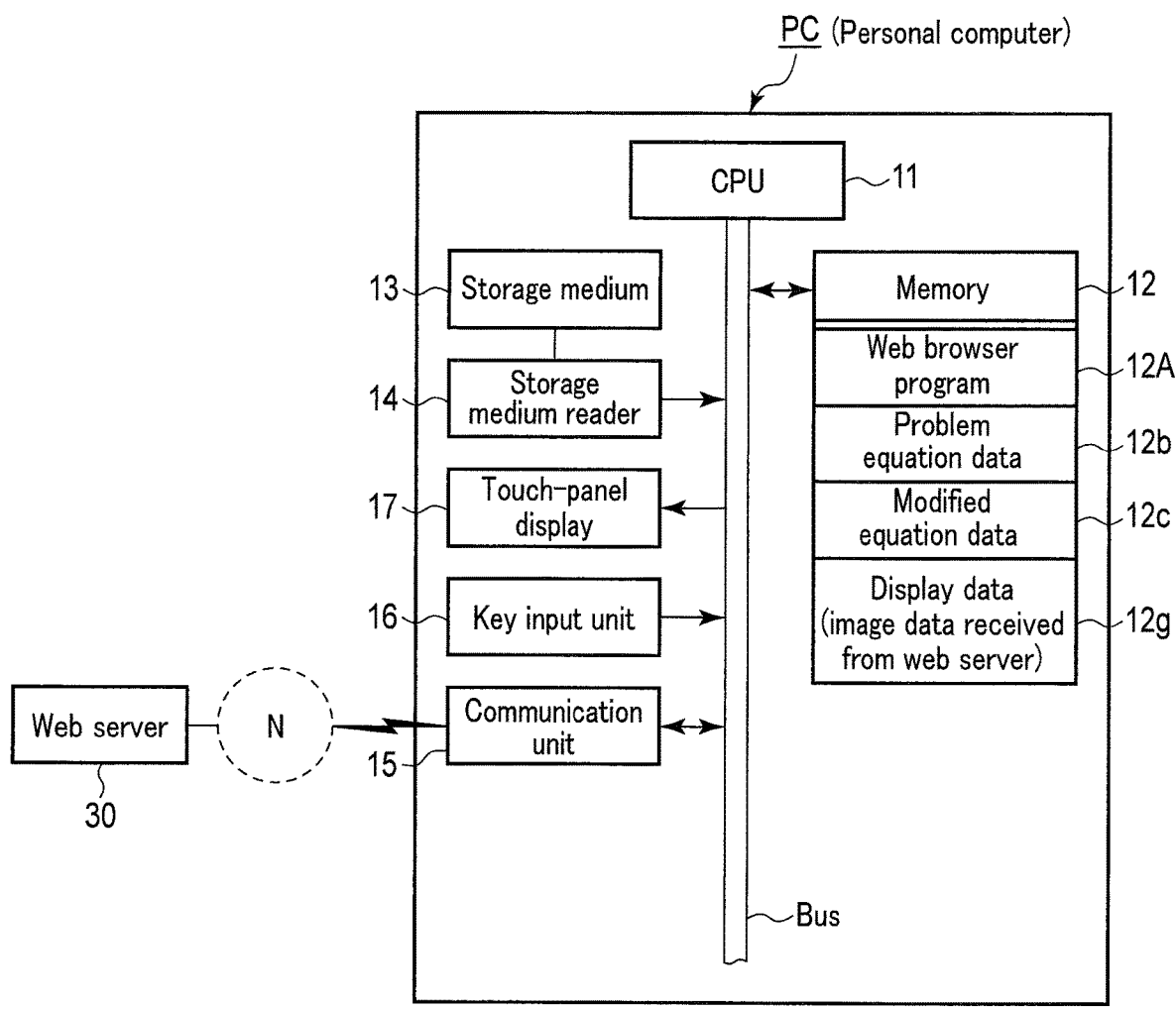
FIG. 16 is a drawing showing an overall configuration of a graph display system according to a third embodiment in which a personal computer PC, a graph generation dedicated site (Web server) 30 are operated in conjunction.

FIG. 16 is a drawing showing an overall configuration of a graph display system according to a third embodiment of the present invention in which a personal computer (first electronic device) PC and a graph generation dedicated site (Web server) 30 are operated in conjunction.

In the third embodiment, data consisting of the problem equation that is input through a Web application that operates on the Web browser running on the personal computer PC and related information (equation number) of the problem equation, and data of the modified equation and its related information (equation number) are transmitted to the graph generation dedicated site 30 in accordance with an user operation that is accepted after each equation is input, and receives and displays image data of a graph corresponding to the equations generated by the dedicated site 30.

Similarly to the first and second embodiments, it is thereby possible to display and check the graphs corresponding to the problem equation and modified equation on the Web browser, allowing a user to easily visualize the graphs and to check whether the user's input modified equation corresponding to the problem equation is correct or not, without generating and displaying the graphs by the Web application that operates on the Web browser running on the personal computer PC.

As shown in FIG. 16, the personal computer PC has the same configuration as the graphing scientific calculator 10, except that a Web browser program 12A is stored in the memory 12 instead of the calculator control program 12a in the memory 12 of the graphing scientific calculator 10. The display data 12g stored in the memory 12 is data generated by the graph generation dedicated site 30, not by the personal computer PC.

FIG. 17 is a flowchart showing a PC process in accordance with the Web browser program 12A in the personal computer PC in a graph display system according to the third embodiment.

Figure 18:
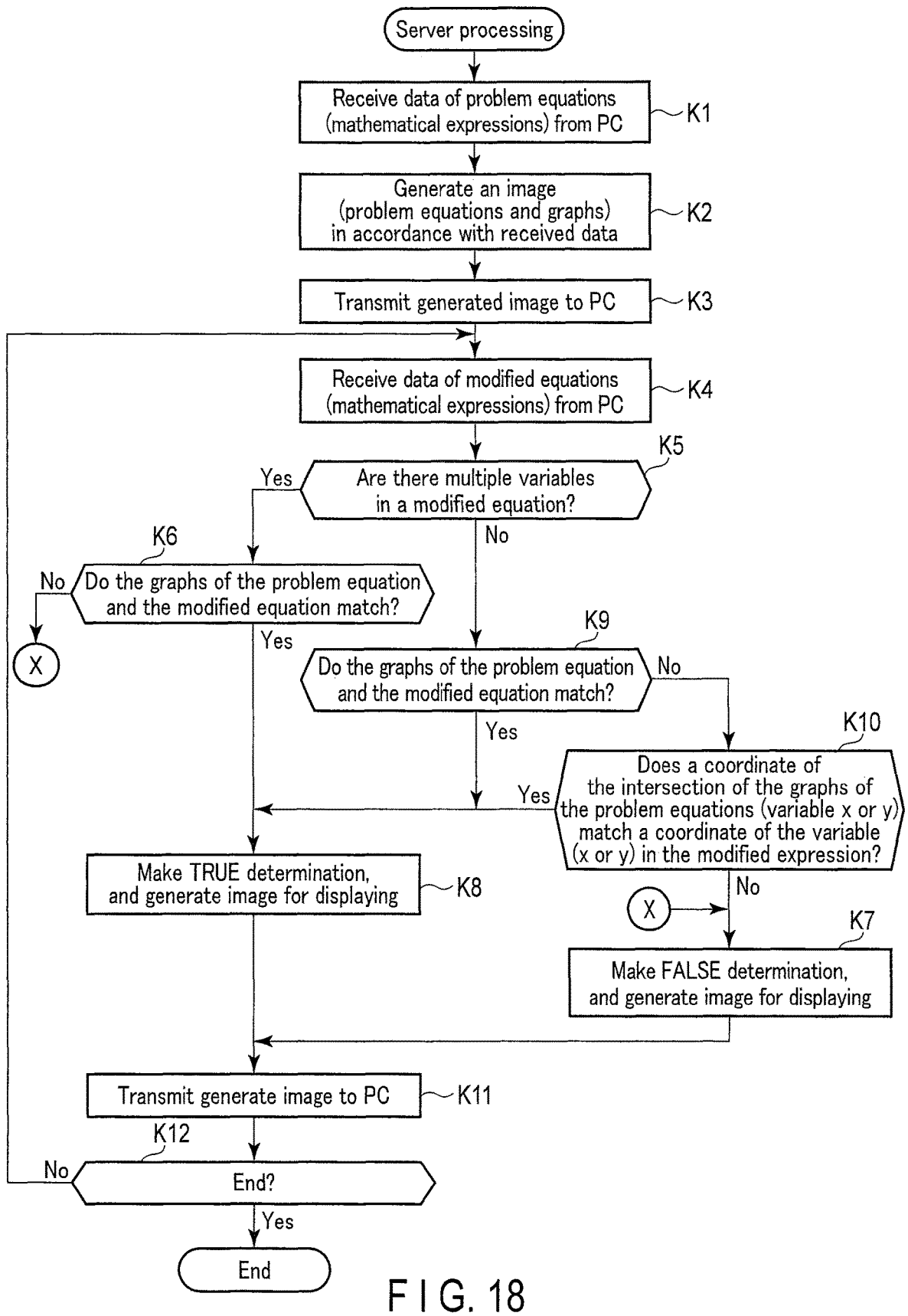
FIG. 18 is a flowchart showing a server process of a graph generation dedicated site (Web server) 30 of the graph display system, according to the third embodiment.

FIG. 18 is a flowchart showing a server process in the graph dedicated site (Web server) 30 of the graph display system according to the third embodiment.

Figure 19:
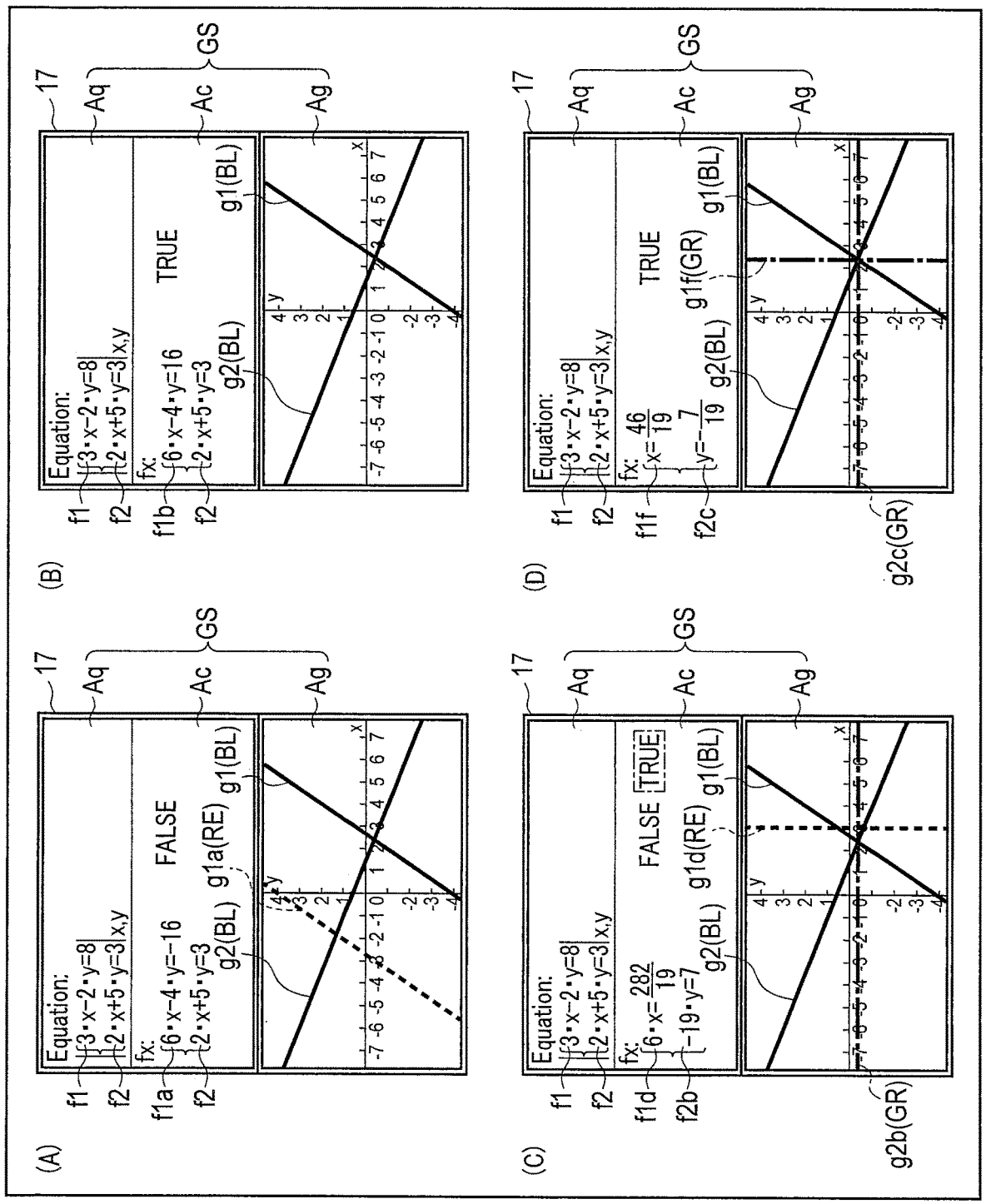
FIG. 19 is a drawing showing a display operation in accordance with a user's operation in which the personal computer PC and the graph generation dedicated site (Web server) 30 are operated in conjunction.

FIG. 19 is a drawing showing a display operation using the personal computer PC and the graph generation dedicated site (Web server) 30 in conjunction, in accordance with a user's operation.

In the server process at the graph generation dedicated site (Web server) 30 shown in FIG. 18, the process of determining true or false of a modified equation (step K5 through step K10) are the same as that included in the calculator process of the first embodiment shown in FIG. 2 (steps S4, S5 and S7 through S10); accordingly, the detailed description of the determination process will be omitted.

In the personal computer PC, the Web browser program 12A is activated in response to a user's operation (step J1), and when an URL of the graph generation dedicated site is designated, the personal computer PC is connected to the graph generation dedicated site (Web server) 30 (step J2).

At this time, the display 17 of the personal computer PC displays a graph generation image screen GS, which is generated by the graph generation dedicated site 30, in which the top part is allocated for a problem equation area Aq, the middle part is allocated for a modified equation area Ac, and the bottom part is allocated for a graph area Ag, as shown in FIG. 19.

In the personal computer PC, a cursor Cu indicating a data input position is displayed within the problem equation are Aq of the graph generation screen GS in response to a user's operation, and an equation which is a target for learning (a problem equation) is input (step J3).

In this example, the following set of simultaneous equations f1 and f2 with two unknowns, which are the same as those in the first and second embodiments, are input and displayed as problem equations.

$$3x-2y=8 \qquad \text{f1}$$

$$2x+5y=3 \qquad \text{f2}$$

At this time, if the area to which the equations (problem equations) f1 and f2 are input is the problem equation area Aq in the graph generation screen GS, information indicating that the equations f1 and f2 are problem equations. When the input of the simultaneous equations f1 and f2 with two unknowns, which are the problem equations, is determined in response to a user's operation of the [ENTER] key in the key input unit 16 (Yes in step J4), data of the equations f1 and f2 (problem equations) is transmitted to the connected graph generation dedicated site (Web server) 30, along with information indicating that the equations f1 and f2 (problem equations) are problem equations (step J5).

In the graph generation dedicated site (Web server) 30, when the data of the problem equations f1 and f2 transmitted from the personal computer PC is received, the received data of the problem equations f1 and f2 is associated with a terminal ID of the personal computer PC as an origin of the data transmission and an equation number (0), and stored in the terminal data storage area 31 (see FIG. 8) (step K1).

In the terminal data storage area 31 in the graph generation dedicated site (Web server) 30 according to the third embodiment (see FIG. 8), the received data of the related information of the equation (a coordinate range, a result of a true-false determination (TRUE/FALSE)) is generated by the graph generation dedicated site (Web server) 30 and stored.

In the graph generation dedicated site 30, a graph generation screen GS (see FIG. 19) to be displayed in the personal computer PC is ensured for an internal image memory, and as shown in (A) of FIG. 19, the equations f1 "3x−2y=8" and f2 "3x+5y=3" which are problem equations stored in the terminal data storage area 31 are drawn in the problem equation area Aq in the graph generation screen GS, and a graph g1 corresponding to the equation f1 and a graph g2 corresponding to the equation f2 are drawn in blue BL in the graph area Ag, thereby generating an image of the graph generation screen GS (step K2).

The generated image data of the graph generation screen GS is transmitted to the personal computer PC which is the transmission origin of the data (step K3).

In the personal computer PC, when the image data of the graph generation screen GS generated by the graph generation dedicated site 30 is received, the image data is displayed on the display 17 as shown in (A) of FIG. 19 (step J6).

Thus, in the third embodiment, in accordance with the simultaneous equations f1 and f2 with two unknowns that are input at the personal computer PC as problem equations, the graphs g1 and g2 generated by the graph generation dedicated site 30 are received and displayed by the personal computer PC; thus, the user can easily visualize the relationship of the variables x and y included in the equations f1 and f2, similarly to the first and second embodiments, even when the personal computer PC does not have a graph drawing function.

Subsequently, a cursor Cu indicating a data input position is displayed in the modified equation input area Ac of the graph generation screen GS in response to a user's operation of the key input unit 16, and modified equations for the equations f1 and f2 as the problem equations are input (step J7). More specifically, as shown in (A) of FIG. 19, in the modified equation input area Ac of the graph generation screen GS displayed in the display 17, the modified equation f1a "6x−4y=−16", which is obtained by modifying the equation f1 "3x−2y=8", is first input and displayed in response to a user's operation (step J7). At this time, the modified equation f1a "6x−4y=−16" and the equation f2 "2x+5y=3" are displayed together in the modified equation area Ac.

At this time, if the area to which the equation (modified equation) f1a is input is the modified equation area Ac in the graph generation screen GS, information indicating that the equation f1a is a modified equation is generated. When the input of the modified equation f1a is determined in response to a user's operation of the [ENTER] key in the key input unit 16 (Yes in step J8), data of the modified equation f1a in the modified equation area Ac is transmitted to the connected graph generation dedicated site (Web server) 30, along with information indicating that the equation (modified equation) f1a is a modified equation (step J9).

In the graph generation dedicated site (Web server) 30, when the data of the modified equation f1a transmitted from the personal computer PC is received, the received data of the modified equation f1a is associated with a terminal ID of the personal computer PC as an origin of the data transmission and an equation number (1), and stored in the terminal data storage area 31 (see FIG. 8) (step K4). At this time, the solutions to the variables x and y of the equations (modified equations) f1a and f2 are calculated, and a two-degree coordinate range (coordinate system) including the coordinate values of the solutions to the variables x and y is set and stored in the terminal data storage area 31 (see FIG. 8).

Similarly to the process of determining true or false of the modified equation in the first embodiment (step S4 and step S5) (see FIG. 2), it is determined that there are two variables (x and y) in the modified equation f1a "6x−4y=−16" (Yes in step K5), and it is determined that the graph equation corresponding to the modified equation f1a "6x−4y=−16" does not match the graph equation corresponding to the equation f1 "3x−2y=8", and the graphs corresponding to f1 and the modified equation f1a are not identical (No in step K6).

Then, the modified equation f1a "6x−4y=−16", the other equation f2 "2x+5y=3", and an error message "FALSE" to notify the user that the modified equation f1a is incorrect are drawn in the modified equation area Ac of the graph generation screen GS reserved in the internal image memory (see (A) of FIG. 19), and an image for the graph generation screen GS in which the graph g1a based on a graph equation corresponding to the modified equation f1a is distinguishably drawn in red RE in the coordinate range of the graph area Ag where the graphs g1 and g2 drawn in blue BL corresponding to the equations f1 and f2 as the problem equations are drawn, is generated (step K7).

The generated image data of the graph generation screen GS is transmitted to the personal computer PC which is the transmission origin of the data (step K11).

In the personal computer PC, when the image data of the graph generation screen GS generated by the graph generation dedicated site 30 is received, the image data is displayed on the display 17 as shown in (A) of FIG. 19 (step J10).

Similarly to the first and second embodiments, in the personal computer PC, the user can thereby immediately know that the user's input modified equation f1a "6x−4y=−16" is incorrect, and easily visualize how the modified equation f1a "6x−4y=−16" is incorrect based on a difference between the distinguished graph g1a shown in red RE corresponding to the modified equation f1a and the graph g1 drawn in blue BL corresponding to the equation f1, without generating and displaying a graph and performing a true-false determination by the Web application operating on the Web browser running on the personal computer PC.

Next, in the personal computer PC, the user's corrected modified equation f1b "6x−4y=16", which is obtained by correcting the incorrect modified equation f1a "6x−4y=−16", is input and displayed as shown in (B) of FIG. 19 (step J7), and the input of the modified equation f1b is determined in response to a user's operation of the [ENTER] key (Yes in step J8), and the data of the modified equation f1b is transmitted to the connected graph generation dedicated site (Web server) 30 (step J9).

When the data of the modified equation f1b transmitted from the personal computer PC is received in the graph generation dedicated site (Web server) 30 (step K4), similarly to the above, it is determined whether the graph corresponding to the equation f1 "3x−2y=8" and the graph corresponding to the corrected modified equation f1b "6x−4y=16" are identical or not, and it is determined whether the modification of the modified equation f1b is correct or not (step K5, then step K6).

If it is determined that the graph corresponding to the equation f1 "3x−2y=8" and the graph corresponding to the corrected modified equation f1b "6x−4y=16" are identical (Yes in step K6), the modified equation f1b and a message "TRUE" notifying the user that the corrected modified equation f1b are drawn in the modified equation area Ac in the graph generation screen GS reserved in the internal image memory (see (B) of FIG. 19). At this time, the graph corresponding to the corrected modified equation f1b "6x−4y=16" is identical to the graph g1 corresponding to the equation f1 "3x−2y=8" which has already been drawn in the graph area Ag of the graph generation screen GS (see (B) of FIG. 19); thus, the graph corresponding to the modified equation f1b is not drawn (step K8). Similarly to the foregoing embodiments, the user may be notified that the equation f1 and the corrected equation f1b are mathematically identical by changing the display of the graph g1 with time. More specifically, the graph g1 may be displayed by flashing, or displayed in a different color which can be switched from one to another, or displayed in different thickness or in a different type of line, to make variations in the display with time. The generated image data of the graph generation screen GS is transmitted to the personal computer PC which is the transmission origin of the data (step K11).

In the personal computer PC, similarly to the above, when the image data of the graph generation screen GS generated by the graph generation dedicated site 30 is received, the image data is displayed on the display 17 as shown in (B) of FIG. 19 (step J10).

Next, similarly to the above, in the personal computer PC, the user's further modified equation f1d "6x=282/19", which is obtained by further modifying the modified equation f1b "6x−4y=16" which is a modification of the equation f1 "3x−2y=8", is input and displayed as shown in (C) of FIG. 19 (step J7), and the input of the modified equation f1d is determined in response to a user's operation of the [ENTER] key (Yes in step J8), and the data of the modified equation f1d is transmitted to the connected graph generation dedicated site (Web server) 30 (step J9).

When the modified equation f1d "6x=282/19" transmitted from the personal computer PC is received in the graph generation dedicated site (Web server) 30 (step K4), it is determined that there is only one variable included in the modified equation f1d (x in this example) (No in step K5), and it is determined whether the graph g1 (graph equation) corresponding to the equation f1 is identical to a graph (graph equation) corresponding to the modified equation f1d or not (step K9).

In this example, there are two variables x and y in the graph g1 corresponding to the equation f1 "3x−2y=8" (the graph g1 shows a linear line having a gradient with respect to the x and y axes), and there is one variable x in the graph (graph equation) corresponding to the modified equation f1d "6x=282/19" (the graph shows a linear line orthogonal to the x axis and parallel to the y axis); therefore, it is determined that the graphs (graph equations) do not match (No in step K9).

Then, it is determined whether or not the coordinate value of the intersection of the graphs g1 and g2 (i.e., a solution to the variable x or y) matches the coordinate value of the variable (x) included in the modified equation f1d "6x=282/19" (step K10).

Then, it is determined that the coordinate value (x) of the intersection of the graphs g1 and g2 corresponding to the equations f1 and f2 does not match the coordinate value of the variable (x) included in the modified equation f1d "6x=282/19" (No in step K10), the modified equation f1d "6x=282/19" and an error message "FALSE" to notify the user that the modified equation f1d is incorrect are drawn in the modified equation area Ac of the graph generation screen GS reserved in the internal image memory (see (C) of FIG. 19), and an image for the graph generation screen GS in which the graph g1d based on a graph equation corresponding to the modified equation f1d is distinguishably drawn in red RE in the coordinate range of the graph area Ag where the graphs g1 and g2 drawn in blue BL corresponding to the equations f1 and f2 as the problem equations are drawn, is generated (step K7).

The generated image data of the graph generation screen GS is transmitted to the personal computer PC which is the transmission origin of the data (step K11).

In the personal computer PC, when the image data of the graph generation screen GS generated by the graph generation dedicated site 30 is received, the image data is displayed on the display 17 as shown in (C) of FIG. 19 (step J10).

The user can thereby immediately know that the user's input modified equation f1*d* "6x=282/19" is incorrect, and easily visualize how the modified equation f1*d* "6x=282/19" is incorrect based on a shift of the distinguished graph g1*d* shown in red RE corresponding to the modified equation f1*d* from the intersection of the graphs g1 and g2 drawn in blue BL corresponding to the equations f1 and f2 in the positive direction with respect to the x axis, without generating and displaying a graph and performing a true-false determination by the Web application operating on the Web browser running on the personal computer PC.

Next, in the personal computer PC, the user's corrected modified equation f2*b* "−19y=7" which is obtained from the equation f2 "2x+5y=3" is input and displayed as shown in (C) of FIG. 19 (step J7), and the input of the modified equation f2*b* is determined in response to a user's operation of the [ENTER] key (Yes in step J8), and the data of the modified equation f2*b* is transmitted to the connected graph generation dedicated site (Web server) 30 (step J9).

In the graph generation dedicated site (Web server) 30, when the data of the modified equation f2*b* "−19y=7" transmitted from the personal computer PC is received (step K4), it is determined that there is only one variable included in the modified equation f2*b* (y in this example) (No in step K5), and it is determined whether the graph g2 (graph equation) corresponding to the equation f2 is identical to a graph (graph equation) corresponding to the modified equation f2*b* or not (step K9).

In this example, there are two variables x and y in the graph g2 (graph equation) corresponding to the equation f2 (the graph g2 shows a linear line having a gradient with respect to the x and y axes), and there is one variable y in the graph (graph equation) corresponding to the modified equation f2*b* (the graph shows a linear line parallel to the x axis and orthogonal to the y axis); therefore, it is determined that the graphs (graph equations) do not match (No in step K9).

Then, it is determined whether or not the coordinate value of the intersection of the graphs g1 and g2 corresponding to the equations f1 and f2 (i.e., a solution to the variable x or y) matches the coordinate value of the variable (y) included in the modified equation f2*b* (step K10).

Then, it is determined that the coordinate value (y) of the intersection of the graphs g1 and g2 corresponding to the equations f1 and f2 matches the coordinate value of the variable (y) included in the modified equation f2*b* (Yes in step K10), the modified equation f2*b* "−19y=7" and a message "TRUE" to notify the user that the modified equation f2*b* is correct are drawn in the modified equation area Ac of the graph generation screen GS reserved in the internal image memory (see (C) of FIG. 19), and an image for the graph generation screen GS in which the graph g2*b*, the graph g2*b* intersecting the intersection of the graphs g1 and g2 and being orthogonal to the coordinate axis y, distinguishably drawn in green GR based on the graph equation corresponding to the modified equation f2*b* "−19y=7" is distinguishably drawn in red RE in the coordinate range of the graph area Ag where the graphs g1 and g2 drawn in blue BL corresponding to the equations f1 and f2 as the problem equations are drawn, is generated (step K7).

The generated image data of the graph generation screen GS is transmitted to the personal computer PC which is the transmission origin of the data (step K11).

In the personal computer PC, when the image data of the graph generation screen GS generated by the graph generation dedicated site 30 is received, the image data (a message "TRUE" in this example) is displayed on the display 17 as shown in (C) of FIG. 19 (step J10).

In this case, similarly to the above, the user can immediately know that the user's input modified equation f2*b* "−19y=7" is correct, and can easily visualize the relationship between the graphs g1 and g2 drawn in blue BL corresponding to the equations f1 and f2 and the graph g2*b* distinguishably drawn in green GR corresponding to the modified equation f2*b*, in other words, visualize the coordinate value of the intersection of the graphs g1, g2, and g2*b* as solutions to the equations f1 and f2, without a need of generating and displaying a graph and making a true/false determination on a modified equation by the Web application operating on the Web browser running on the personal computer PC.

Subsequently, in the personal computer PC, a modified equation f1*f* "x=46/19", which is a final modification of the original equation f1 "3x−2y=8" which has been modified in stages, and a modified equation f2*c* ""y=−(7/19)", which is a final modification of the original equation f2 "2x+5y=3" which has been modified in stages, are successively input in response to a user's operation as shown in (D) of FIG. 19 (step J7), and when an input of each of the modified equations f1*f* and f2*c* is determined in response to a user's operation of the [ENTER] key at each time (Yes in step J8), data of the modified equation f1*f* and data of the modified equation f2*c* are transmitted to the connected graph generation dedicated site (Web server) 30 (step J9).

In the graph generation dedicated site (Web server) 30, when the data of the modified equation f1*f* and data of the modified equation f2*c* transmitted from the personal computer PC are successively received (step K4), it is determined, each time the data is received, whether or not the coordinate value (x), (y) of the intersection of the graphs g1 and g2 corresponding to the equations f1 and f2 matches the coordinate value of the variables (x), (y) included in the modified equations f1*f* and f2*c* as the final modifications (Yes in step K10).

The final forms of the modified equations f1*f* "x=46/19" and f2*c* "y=−(7/19)" and a message "TRUE" notifying that the modified equations f1*f* and f2*c* are correct are drawn in the modified equation area AC in the graph generation screen GS reserved in the internal image memory (see (D) of FIG. 19). An image for the graph generation screen GS is generated by distinguishably drawing graphs g1*f* and g2*c* in green GR based on the graph equations corresponding to the modified equations f1*f* and f2*c* in the coordinate range of the graph area AG where the graphs g1 and g2 corresponding to the equations f1 and f2 as problem equations are drawn in blue BL, the graph g1*f* orthogonal to the coordinate axis x and corresponding to the modified equation f1*f* and the graph g2*c* orthogonal to the coordinate axis y and corresponding to the modified equation f2*c*, both of the graphs g1*f* and g2*c* passing the intersection of the graphs g1 and g2 (step K8).

The generated image data of the graph generation screen GS is transmitted to the personal computer PC which is the transmission origin of the data (step K11).

In the personal computer PC, similarly to the above when the image data of the graph generation screen GS generated by the graph generation dedicated site 30 is received, the image data is displayed on the display 17 as shown in (D) of FIG. 19 (step J10).

Similarly to the first and second embodiments, it is thereby possible for the user to immediately know that the modified equations f1*f* and f2*c* are correct as the graphs g1*f* and g2*c* are distinguishably displayed in green GR along with the message "TRUE", even if the graphs g1*f* and g2*c* in green GR corresponding to the user's input modified equations f1*f* and f2*c* (equations with one unknown) are not identical to the graphs g1 and g2 corresponding to the simultaneous equations with two unknowns f1 and f2 in blue BL, and to easily check that all the graphs g1, g2, g1*f* and g2*c* intersects at one coordinate and coordinate value of the intersection is a solution to the equations f1 and f2.

In the personal computer PC, when finishing of the operation is instructed by a user's operation thereafter (Yes in step J11), the connection with the graph generation dedicated site (Web server) 30 is disconnected, and the series of the PC process is finished.

In the graph generation dedicated site (Web server) 30, when the connection with the personal computer PC is disconnected, the series of the server process is finished (Yes in step K12).

Thus, in the graph display system according to the configuration of the third embodiment in which the personal computer (first electronic device) PC and the graph generation dedicated site (Web server) 30 are operated in conjunction, it is possible to check true/false of a modified equation using a Web browser that can operate on a general-purpose personal computer PC, even when a user does not have a dedicated device. Furthermore, a true-false determination, for example, may be performed in a server apparatus on the Internet without using a script that operates on a Web browser, so that confidentiality of the determination can be concealed.

In each of the above-described embodiments, the graphs g1*a* and g1*d* (the second graph (or the third graph)) corresponding to the modified equations f1*a* and f1*d* (the second mathematical expression (or the third mathematical expression)) for which solutions to the variables do not match are displayed in red RE so as to be distinguished from the graphs g1 and g2 (the first graph) in blue BL corresponding to the simultaneous equations f1 and f2 with two unknowns (the first mathematical expression) as problem equations, and even when the solutions to the variables match, the graphs g1*c*, g1*e*, g1*f*, g2*b*, g2*c* (the second and third graphs) corresponding to the modified equations (equations with one unknown) f1*c*, f1*e*, f1*f*, f2*b*, and f2*c* (the second and third mathematical expressions) including one variable (x or y) are distinguishably drawn in green GR; however, the distinction of the graphs may be made not only by using different colors for the graphs, but by using different types of line or different thickness of line.

In each of the above-described embodiments, when a user inputs incorrect modified equations f1*a* and f1*d* (the second mathematical expression (or the third mathematical expression) for simultaneous equations f1 and f2 with two unknowns (the first mathematical expression) as problem equations, an error message "FALSE" to notify the user that the modified equations f1*a* and f1*d* are incorrect is displayed in the modified equation input area Gc in the display unit 17 in the graphing scientific calculator 10 (or the message is drawn in the modified equation area Ac in the graph generation screen GS generated by the graph generation dedicated site 30); however, the user may be notified of an error not only by a text message, such as "FALSE", but also by symbols, figures, or sounds.

As described above, in the graph display method in each of the above-described embodiments, a first graph (either one of g1 or g2) corresponding to a first mathematical expression (either one of the simultaneous equations f1 and r2 with two unknowns) and a second graph (the other one of g1 and g2) corresponding to a second mathematical expression (the other one of f1 and f2) on the display 17, the first and second mathematical expressions being mutually-different equations including two or more variables, and after accepting an input of a third mathematical expression (modified expressions f1*c*, f1*d*, f1*e*, f1*f*, f2*b*, f2*c*) having a notation different from that of the first and second mathematical expressions as a modified expression for solving the equations (in this case, when displaying the third mathematical expression includes one variable (x or y) among two variables (x and y) included in the above equations), a third graph (graphs g1*c*, g1*d*, g1*e*, g1*f*, g2*b*, g2*c*) corresponding to the input third mathematical expression on the display 17, the third graph is displayed in a way of displaying, the way being different depending on a condition whether or not any one solution of at least one solution to the one variable obtained by the third mathematical expression matches a solution to the one variable selected from at least one set of solutions to the two variables included in the equations obtained by the first and second mathematical equations is satisfied (g1*c* (GR) in (D) of FIG. 3; and g2*b* (GR) in (A) of FIG. 4; g1*e* (GR) in (C) of FIG. 4; g1*f* (GR) and g2*c* (GR) in (D) of FIG. 4; g1*f* (GR) and g2*c* (GR) in the bottom part of FIG. 15; g2*b* (GR) in (C) of FIG. 19; g1*f* (GR) and g2*c* (GR) in (D) of FIG. 19), or not satisfied (g1*d* (RE) in (B) of FIG. 4, g1*d* (RE) in (C) of FIG. 19).

As described above, the graph display method in each of the above-described embodiments further includes a process of displaying, after accepting an input of a fourth mathematical expression as a modified equation to solve the above equations (modified equations f1*c*, f1*d*, f1*e*, f1*f*, f2*b*, and f2*c*) (in this case, the fourth mathematical expression includes one variable (x or y) among two variables (x and y) included in the above equations), a fourth graph corresponding to the input fourth mathematical expression (graphs g1*c*, g1*d*, g1*e*, g1*f*, g2*b*, and g2*c*) on the display 17, the fourth equation having a notation different from that of any of the first, second, and third mathematical expressions, and according to the method, the fourth graph is displayed on the display 17 in a way of displaying, the way being different depending on whether a condition that any one of at least one set of solutions to the two variables included in the equations obtained by the third and fourth mathematical expressions matches a set of solutions selected from at least one set of solutions to the two variables included in the equations obtained from the first and second mathematical expressions is satisfied (g1*c* (GR) and g2*b* (GR) in (A) of FIG. 4; g1*e* (GR) in (C) of FIG. 4; g1*f* (GR) and g2*c* (GR) in (D) of FIG. 4; g1*f* (GR) and g2*c* (GR) in the bottom part of FIG. 15; g1*f* (GR) and g2*c* (GR) in (D) of FIG. 19) or not satisfied (g1*d* (RE) in (B) of FIG. 4 and g1*d* (RE) in (C) of FIG. 19).

Furthermore, as described above, in the graph display method in each of the above-described embodiments, a first graph (g1 or g2) corresponding to a first mathematical expression (equations f1 or f2 in a set of simultaneous equations with two unknowns) is displayed on the display 17, and after accepting an input of a third mathematical expression (modified expression f1*a*, fib, or f2*a*) having a notation different from that of the first mathematical expression as a modified equation of the first mathematical expression, when displaying a third graph corresponding to the third mathematical expression (g1*a*, g1 (displayed by flashing), or g2 (displayed by flashing)), the third graph is displayed on the display 17 in a way of displaying, the way being different depending on whether a condition that the first mathematical expression and the third mathematical expression are mathematically identical or not (g1 (BL)

(displayed by flashing) in (B) of FIG. 3; g2 (BL) (displayed by flashing) in (C) of FIG. 3; g1 (BL) (displayed by flashing) or g2 (BL) (displayed by flashing) in the top part of FIG. 15; g1 (BL) (displayed by flashing) in (B) of FIG. 19) is satisfied or not (g1a (RE) in (A) of FIG. 3; g1a (RE) in the bottom part of FIG. 14; g1a (RE) in (A) of FIG. 19).

The process in each of the graphing scientific calculator (electronic device) 10, the portable terminal 20, the graph generation dedicated site (Web server) 30, the personal computer PC described in each of the above embodiments, in other words, the calculation process by the graphing scientific calculator 10 in the first embodiment as shown in the flowchart of FIG. 2, the calculation process by the graphing scientific calculator 10 in the second embodiment as shown in the flowcharts of FIGS. 10 and 11, the terminal process by the portable terminal 20 in the second embodiment as shown in the flowchart of FIG. 13, and the server process by the graph generation dedicated site (Web server) 30 in the second embodiment as shown in the flowchart of FIG. 12, the PC process by the personal computer PC in the third embodiment as shown in the flowchart of FIG. 17, and the server process by the graph generation dedicated site 30 in the third embodiment as shown in the flowchart of FIG. 18, may be stored in a recording medium, such as a memory card (an ROM card, an RAM card, etc.), a magnetic disc (a floppy (registered trademark) disc, hard disc, etc.), an optical disk (CD-ROM, DVD, etc.), a semiconductor memory, etc., as a program that can be executed by a computer, and may be distributed in the form of such recording medium. Furthermore, a computer (CPU) of an electronic device reads the program stored in the medium of the external storage apparatus, and the operations can be executed and controlled based on the read programs, thereby realizing the calculation function, the modified equation checking function, the graph drawing function described in the embodiments, and executing processing similar to the above-described processes.

The data of the programs for realizing each of the above-described processes can be transmitted on a communication network (N) in a form of program codes, and date of the programs is obtained from a computer apparatus (program server) connected to this communication network (N) and imported to an electronic device, and stored in a storage apparatus, thereby realizing the aforementioned calculation function, modified equation checking function, and graph drawing function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A graph display method comprising:
    controlling, by one or more processors, a display to display a first graph corresponding to a first mathematical expression and a second graph corresponding to a second mathematical expression,
        wherein the first mathematical expression and the second mathematical expression are equations that include two or more variables, and
        wherein the first mathematical expression and the second mathematical expression are different from each other; and
    receiving, by the one or more processors, input of a third mathematical expression, as a modified expression for solving the equations, having a notation different from that of the first mathematical expression and the second mathematical expression,
        wherein the third mathematical expression includes one of the two or more variables included in the equations;
    determining, by the one or more processors, whether a condition that any one of at least one solution to the one variable obtained from the third mathematical expression matches a solution to a first variable that is selected from at least one set of solutions to the two or more variables included in the equations obtained from the first mathematical expression and the second mathematical expression is satisfied;
    controlling, by the one or more processors, the display to display a third graph corresponding to the third mathematical expression in a first line format, in response to determining that the condition is satisfied; and
    controlling, by the one or more processors, the display to display the third graph corresponding to the third mathematical expression in a second line format different from the first line format, in response to determining that the condition is not satisfied.

2. The graph display method according to claim 1, comprising:
    controlling, by the one or more processors, the display to display the first graph and the second graph in the same line format; and
    controlling, by the one or more processors, the display to display the third graph along with the first graph and the second graph, where the first line format and the second line format of displaying the third graph is different from that of displaying the first graph and the second graph.

3. The graph display method according to claim 1, comprising:
    controlling, by the one or more processors, the display to display a fourth graph corresponding to a fourth mathematical expression after accepting an operation to input the fourth mathematical expression as a modified expression for solving the equations,
        wherein the fourth mathematical expression includes one variable among the two or more variables included in the equations, and
        wherein the fourth mathematical expression has a notation different from that of the first mathematical expression, the second mathematical expression, and the third mathematical expression;
    determining, by the one or more processors, whether a second condition that any one set of at least one set of solutions to the two or more variables included in the equations obtained from the third mathematical expression and the fourth mathematical expression matches one set of solutions selected from at least one set of solutions to the two variables included in the equations obtained from the first mathematical expression and the second mathematical expression is satisfied; and
    controlling, by the one or more processors, the display to display the fourth graph in a third line format, in response to determining that the second condition is satisfied; and
    controlling, by the one or more processors, the display to display the fourth graph in a fourth line format different from the third line format, in response to determining that the second condition is not satisfied.

4. The graph display method according to claim 3, comprising:

controlling, by the one or more processors, the display to display the first graph and the second graph in the same line format; and determining, by the one or more processors, a set of solutions obtained from the third mathematical expression and the fourth mathematical expression does not match a set of solutions obtained from the first mathematical expression and the second mathematical expression; and controlling, by the one or more processors, the display to display the fourth graph in a line format different from the line format of the second graph and the third graph, in response to determining the set of solutions obtained from the third mathematical expression and the fourth mathematical expression does not match the set of solutions obtained from the first mathematical expression and the second mathematical expression.

5. The graph display method according to claim 3, comprising:

controlling, by the one or more processors, the display to display the first graph and the second graph in the same line format; and determining, by the one or more processors, a set of solutions obtained from the third mathematical expression and the fourth mathematical expression matches a set of solutions obtained from the first mathematical expression and the second mathematical expression; and controlling, by the one or more processors, the display to display the fourth graph in a line format different from the line format of displaying the first graph and the second graph but in a same line format as the first line format and the second line format of displaying the third graph, wherein the fourth graph is displayed together with the second graph and the third graph, in response to determining that the set of solutions obtained from the third mathematical expression and the fourth mathematical expression matches a set of solutions obtained from the first mathematical expression and the second mathematical expression.

6. The graph display method according to claim 1, wherein the one or more processors are distributed amongst a first electronic device, a second electronic device and a server apparatus, and wherein the graph display method comprises:

receiving, by the first electronic device, input of the first mathematical expression, the second mathematical expression and the third mathematical expression;

transmitting, by the first electronic device, the first mathematical expression, the second mathematical expression and the third mathematical expression to the second electronic device;

determining, by the second electronic device, whether the condition that any one of at least one solution to the one variable obtained from the third mathematical expression matches the solution to the first variable that is selected from the at least one set of solutions to the two or more variables included in the equations obtained from the first mathematical expression and the second mathematical expression is satisfied;

transmitting, by the second electronic device, a result of the determining to the server apparatus;

generating, by the server apparatus, data for the third graph based on the result of the determining transmitted by the second electronic device;

transmitting, by the server apparatus, the data for the third graph to the second electronic device; and controlling, by the second electronic device, the display provided on the second electronic device, to display the first graph, the second graph and the third graph based on the data for the third graph transmitted by the server apparatus.

7. The graph display method according to claim 1, wherein the one or more processors are distributed amongst an electronic device and a server apparatus, and wherein the graph display method comprises:

receiving, by the electronic device, input of the first mathematical expression, the second mathematical expression and the third mathematical expression;

transmitting, by the electronic device, the first mathematical expression, the second mathematical expression and the third mathematical expression to the server apparatus;

determining, by the server apparatus, whether the condition that any one of at least one solution to the one variable obtained from the third mathematical expression matches the solution to the first variable that is selected from the at least one set of solutions to the two or more variables included in the equations obtained from the first mathematical expression and the second mathematical expression is satisfied;

generating, by the server apparatus, data for the third graph based on a result of the determining;

transmitting, by the server apparatus, the data for the third graph to the electronic device; and controlling, by the electronic device, the display provided on the electronic device, to display the first graph, the second graph and the third graph based on the data for the third graph transmitted by the server apparatus.

8. A graph display method comprising:

controlling, by a processor, a display to display a first graph corresponding to a first mathematical expression;

receiving, by the processor, input of a third mathematical expression, as a modified expression of the first mathematical expression, having a notation different from that of the first mathematical expression;

determining, by the processor, whether a condition that the first mathematical expression is mathematically identical to the third mathematical expression is satisfied;

controlling, by the processor, the display to display a third graph, corresponding to the third mathematical expression, in a first line format, in response to determining that the condition is satisfied; and controlling the display to display the third graph, corresponding to the third mathematical expression, in a second line format different from the first line format, in response to determining that the condition is not satisfied.

9. An electronic device comprising:

a controller; and a display, wherein the controller is configured to:

control the display to display a first graph corresponding to a first mathematical expression and a second graph corresponding to a second mathematical expression, wherein the first mathematical expression and the second mathematical expression are equations that include two or more variables, and wherein the first mathematical expression and the second mathematical expression are different from each other; and receive input of a third mathematical expression, as a modified expression for solving the equations, having a notation different from that of the first mathematical expression and the second mathematical expression, wherein the third mathematical expression includes one of the two or more variables included in the equations;

determine whether a condition that any one of at least one solution to the one variable obtained from the third mathematical expression matches a solution to a first variable that is selected from at least one set of solutions to the two or more variables included in the equations obtained from the first mathematical expression and the second mathematical expression is satisfied;

control the display to display a third graph corresponding to the third mathematical expression in a first line format, in response to determining that the condition is satisfied; and control the display to display the third graph corresponding to the third mathematical expression in a second line format different from the first line format, in response to determining that the condition is not satisfied.

10. A non-transitory recording medium having a program recorded thereon that is executable to cause a computer of an electronic device to at least perform:

control a display of the electronic device to display a first graph corresponding to a first mathematical expression and a second graph corresponding to a second mathematical expression, wherein the first mathematical expression and the second mathematical expression are equations that include two or more variables, and wherein the first mathematical expression and the second mathematical expression are different from each other; and receive input of a third mathematical expression, as a modified expression for solving the equations, having a notation different from that of the first mathematical expression and the second mathematical expression, wherein the third mathematical expression includes one of the two or more variables included in the equations;

determine whether a condition that any one of at least one solution to the one variable obtained from the third mathematical expression matches a solution to a first variable that is selected from at least one set of solutions to the two or more variables included in the equations obtained from the first mathematical expression and the second mathematical expression is satisfied;

control the display to display a third graph corresponding to the third mathematical expression in a first line format, in response to determining that the condition is satisfied; and control the display to display the third graph corresponding to the third mathematical expression in a second line format different from the first line format, in response to determining that the condition is not satisfied.

* * * * *